United States Patent
Ogawa et al.

(10) Patent No.: US 10,396,924 B2
(45) Date of Patent: *Aug. 27, 2019

(54) TERMINAL STATION APPARATUS, BASE STATION APPARATUS, TRANSMISSION METHOD AND CONTROL METHOD

(71) Applicant: Sun Patent Trust, New York, NY (US)

(72) Inventors: Yoshihiko Ogawa, Kanagawa (JP); Akihiko Nishio, Osaka (JP); Takashi Iwai, Ishikawa (JP); Seigo Nakao, Osaka (JP); Daichi Imamura, Kanagawa (JP); Atsushi Sumasu, Fukuoka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,384

(22) Filed: Jul. 19, 2018

(65) Prior Publication Data

US 2018/0323894 A1    Nov. 8, 2018

Related U.S. Application Data

(63) Continuation of application No. 15/816,703, filed on Nov. 17, 2017, now Pat. No. 10,057,000, which is a (Continued)

(30) Foreign Application Priority Data

Oct. 1, 2009  (JP) .................................. 2009-229649
Apr. 2, 2010  (JP) .................................. 2010-086141

(51) Int. Cl.
*H04J 11/00*  (2006.01)
*H04B 7/0452*  (2017.01)
(Continued)

(52) U.S. Cl.
CPC .......... *H04J 11/003* (2013.01); *H04B 7/0452* (2013.01); *H04B 7/0689* (2013.01);
(Continued)

(58) Field of Classification Search
None
See application file for complete search history.

(56) References Cited

U.S. PATENT DOCUMENTS 6,594,226 B1    7/2003  Benning et al.
7,280,466 B2   10/2007  Tong et al.
(Continued)

FOREIGN PATENT DOCUMENTS

EP    1 109 331 A2     6/2001
WO    02/082687 A1    10/2002
(Continued)

OTHER PUBLICATIONS

Qualcomm Europe, "RS Structure in Support of Higher-order MIMO," R1-091450, 3GPP TSG-RAN WG1 #56bis, Seoul, South Korea, Mar. 23-27, 2009, 10 pages.
(Continued)

*Primary Examiner* — Kouroush Mohebbi
(74) *Attorney, Agent, or Firm* — Seed IP Law Group LLP

(57) ABSTRACT

A terminal apparatus is disclosed wherein even in a case of applying SU-MIMO and MU-MIMO at the same time, the inter-sequence interference in a plurality of pilot signals used by the same terminal can be suppressed to a low value, while the inter-sequence interference in pilot signal between terminals can be reduced. In this terminal apparatus: a pilot information deciding unit decides, based on allocation control information, Walsh sequences of the respective ones of first and second stream groups at least one of which includes a plurality of streams; and a pilot signal generating unit forms a transport signal by using the decided Walsh
(Continued)

| STREAM NUMBER (STREAM #) | WALSH SEQUENCE | CYCLIC SHIFT AMOUNT | |
|---|---|---|---|
| | | PATTERN 1 | PATTERN 2 |
| 0 | w1 (REPORTED) | $\Delta 0$ (REPORTED) | $\Delta 0$ (REPORTED) |
| 1 | w1 | $\Delta 0 + 6 (= \Delta 1)$ | $\Delta 0 + 6 (= \Delta 1)$ |
| 2 | w2 | $\Delta 0 + 3 (= \Delta 2)$ | $\Delta 0 + 9 (= \Delta 2)$ |
| 3 | w2 | $\Delta 0 + 9 (= \Delta 3)$ | $\Delta 0 + 3 (= \Delta 3)$ | sequences to spread the streams included in the first and second stream groups. During this, Walsh sequences orthogonal to each other are established in the first and second stream groups, and users are allocated on a stream group-by-stream group basis.

20 Claims, 22 Drawing Sheets

Related U.S. Application Data continuation of application No. 15/358,714, filed on Nov. 22, 2016, now Pat. No. 9,853,760, which is a continuation of application No. 15/191,317, filed on Jun. 23, 2016, now Pat. No. 9,537,596, which is a continuation of application No. 14/848,149, filed on Sep. 8, 2015, now Pat. No. 9,401,755, which is a continuation of application No. 14/547,042, filed on Nov. 18, 2014, now Pat. No. 9,166,666, which is a continuation of application No. 13/394,789, filed as application No. PCT/JP2010/005893 on Sep. 30, 2010, now Pat. No. 8,917,587.

(51) Int. Cl.

| | | |
|---|---|---|
| *H04B 7/06* | (2006.01) | |
| *H04J 13/00* | (2011.01) | |
| *H04J 13/18* | (2011.01) | |
| *H04L 5/00* | (2006.01) | |
| *H04W 72/04* | (2009.01) | |
| *H04W 72/12* | (2009.01) | |
| *H04W 88/02* | (2009.01) | |
| *H04W 88/08* | (2009.01) | |

(52) U.S. Cl.
CPC .......... *H04J 13/0048* (2013.01); *H04J 13/18* (2013.01); *H04L 5/005* (2013.01); *H04W 72/042* (2013.01); *H04W 72/1226* (2013.01); *H04W 88/02* (2013.01); *H04W 88/08* (2013.01)

(56) References Cited

U.S. PATENT DOCUMENTS

| | | | | |
|---|---|---|---|---|
| 2003/0081539 | A1 | 5/2003 | Tong et al. | |
| 2004/0082356 | A1* | 4/2004 | Walton | H04B 7/022 |
| | | | | 455/522 |
| 2008/0080467 | A1* | 4/2008 | Pajukoski | H04B 1/7103 |
| | | | | 370/342 |
| 2008/0212464 | A1* | 9/2008 | Kim | H04L 27/2602 |
| | | | | 370/210 |
| 2008/0298488 | A1* | 12/2008 | Shen | H04W 72/0406 |
| | | | | 375/260 |
| 2009/0046646 | A1* | 2/2009 | Cho | H04B 1/7097 |
| | | | | 370/329 |
| 2009/0279493 | A1* | 11/2009 | Gaal | H04L 1/1861 |
| | | | | 370/329 |
| 2009/0303978 | A1* | 12/2009 | Pajukoski | H04L 5/0053 |
| | | | | 370/345 |
| 2010/0202386 | A1 | 8/2010 | Takaoka et al. | |
| 2010/0260116 | A1 | 10/2010 | Imamura et al. | |
| 2012/0093120 | A1* | 4/2012 | Ko | H04B 7/0671 |
| | | | | 370/329 |

FOREIGN PATENT DOCUMENTS

| | | |
|---|---|---|
| WO | 2009/037854 A1 | 3/2009 |
| WO | 2009/041067 A1 | 4/2009 |

OTHER PUBLICATIONS

Qualcomm Europe, "Flexible Data and Reference Multiplexing for LTE-Advanced Uplink," R1-092073, 3GPP TSG-RAN WG1 #57, San Francisco, California, May 4-8, 2009, 7 pages.
English Translation of Chinese Search Report dated Aug. 8, 2014, for corresponding CN Application No. 201080039455.4, 2 pages.
Extended European Search Report, dated May 12, 2016, for corresponding EP Application No. 10820155.9-1874 / 2485419, 8 pages.
Etri, "Discussion on DM RS for Uplink SU-MIMO in LTE-A," R1-093436, Agenda Item: 15.5 UL MIMO extension up to 4X4, 3GPP TSG RAN WG1 Meeting #58, Shenzhen, China, Aug. 24-28, 2009, 9 pages.
International Search Report, for PCT/JP2010/005893, dated Nov. 2, 2010, 2 pages.
LG Electronics, "Consideration on rank 3 codebook design for UL SU-MIMO in LTE-A," R1-093257, 3GPP TSG RAN WG1 Meeting #58, Agenda Item: 15.5, Shenzhen, China, Aug. 24-28, 8 pages.
Nokia, Nokia Siemens Networks, "UE-specific reference symbol multiplexing for LTE-Advanced downlink," R1-093303, Agenda Item: 15.1, 3GPP TSG RAN WG1 Meeting #58, Shenzhen, China, Aug. 24-28, 2009, 9 pages.
Nokia Siemens Network, "Reference Signal structure for LTE-Advanced UL SU-MIMO," R1-091772, 3GPP TSG RAN WG1 Meeting #57, Agenda Item: 15.5, San Francisco, CA, USA, May 4-8, 2009, 6 pages.
NTT Docomo, "UL RS Enhancement for LTE-Advanced," R1-092801, 3GPP TSG RAN WG1 Meeting #57bis, Los Angeles, CA, USA, Jun. 29-Jul. 3, 2009, pp. 1-5.
Panasonic, NTT DoCoMo, "Necessity of the Scrambling for the Reference Signal of CQI in PUCCH," R1-082404, 3GPP TSG RAN WG1 Meeting #54, Warsaw, Poland, Jun. 30-Jul. 4, 2008, pp. 1-7.
Texas Instruments, "Discussion on UL DM RS for SU-MIMO," R1-091843, Agenda Item: 15.5, 3GPP TSG RAN WG1 #57, San Francisco, USA, May 4-8, 2009, 3 pages.
Texas Instruments, "Further Analysis on Uplink SU-MIMO for E-UTRA," R1-084445, 3GPP TSG RAN WG1 #55, Agenda Item: 11.2, Prague, Czech Republic, Nov. 10 14, 2008, 8 pages.

* cited by examiner

| STREAM NUMBER (STREAM #) | WALSH SEQUENCE |
|---|---|
| 0 | w1=[1 1] |
| 1 | w2=[1 -1] |
| 2 | w1=[1 1] |
| 3 | w2=[1 -1] |

FIG.3

| STREAM NUMBER (STREAM #) | WALSH SEQUENCE | |
|---|---|---|
| | PATTERN A | PATTERN B |
| 0 | w1 (REPORTED) | w2 (REPORTED) |
| 1 | w1 | w2 |
| 2 | w2 | w1 |
| 3 | w2 | w1 |

FIG.8

| STREAM NUMBER (STREAM #) | WALSH SEQUENCE | |
|---|---|---|
| | PATTERN A | PATTERN B |
| 0 | w1 (REPORTED) | w2 (REPORTED) |
| 1 | w1 | w2 |
| 2 | w1 | w2 |
| 3 | w2 | w1 |

FIG.10

| STREAM NUMBER (STREAM #) | WALSH SEQUENCE | CYCLIC SHIFT AMOUNT | |
|---|---|---|---|
| | | PATTERN 1 | PATTERN 2 |
| 0 | w1 (REPORTED) | Δ0 (REPORTED) | Δ0 (REPORTED) |
| 1 | w1 | Δ0+6(=Δ1) | Δ0+6(=Δ1) |
| 2 | w2 | Δ0+3(=Δ2) | Δ0+9(=Δ2) |
| 3 | w2 | Δ0+9(=Δ3) | Δ0+3(=Δ3) |

FIG.11

| CYCLIC SHIFT AMOUNT REPORTED FROM BASE STATION | | 0 | 2 | 3 | 4 | 6 | 8 | 9 | 10 |
|---|---|---|---|---|---|---|---|---|---|
| CORRESPONDING WALSH SEQUENCE (SAME SIGN : w1) (INVERTED SIGN : w2) | PATTERN 1 | w2 | w2 | w2 | w2 | w1 | w1 | w1 | w1 |
| | PATTERN 2 | w1 | w1 | w1 | w1 | w2 | w2 | w2 | w2 |

↑ WHICH PATTERN IS USED IS REPORTED THROUGH HIGHER LAYER SIGNALING

FIG.12

| CYCLIC SHIFT AMOUNT REPORTED FROM BASE STATION | 0 | 2 | 3 | 4 | 6 | 8 | 9 | 10 |
|---|---|---|---|---|---|---|---|---|
| CORRESPONDING WALSH SEQUENCE | w2 | w2 | w2 | w2 | w1 | w1 | w1 | w1 |

FIG.13

| CYCLIC SHIFT AMOUNT REPORTED FROM BASE STATION | 0 | 2 | 3 | 4 | 6 | 8 | 9 | 10 |
|---|---|---|---|---|---|---|---|---|
| CORRESPONDING WALSH SEQUENCE | w2 | w2 | w2 | w2 | w1 | w1 | w1 | w1 |

PAIR (CS INTERVAL : 6)

FIG.14

| FIRST STREAM | CYCLIC SHIFT AMOUNT REPORTED FROM BASE STATION | 0 | 2 | 3 | 4 | 6 | 8 | 9 | 10 |
|---|---|---|---|---|---|---|---|---|---|
| | CORRESPONDING WALSH SEQUENCE | w1 | w1 | w1 | w1 | w2 | w2 | w2 | w2 |

→ → → → → → → →

| SECOND STREAM | CYCLIC SHIFT AMOUNT | 6 | 8 | 9 | 10 | 0 | 2 | 3 | 4 |
|---|---|---|---|---|---|---|---|---|---|
| | CORRESPONDING WALSH SEQUENCE | w1 | w1 | w1 | w1 | w2 | w2 | w2 | w2 |

→ → → → → → → →

(0,6)  (2,8)  (3,9)  (4,10)  (0,6)  (2,8)  (3,9)  (4,10)

PAIR OF CYCLIC SHIFT AMOUNTS OF FIRST AND SECOND STREAMS

PAIRS OF FIRST AND SECOND STREAMS ARE SAME, BUT WALSH SEQUENCES ASSIGNED TO FIRST AND SECOND STREAMS ARE DIFFERENT

FIG.15

| CYCLIC SHIFT AMOUNT REPORTED FROM BASE STATION | 0 | 2 | 3 | 4 | 6 | 8 | 9 | 10 |
|---|---|---|---|---|---|---|---|---|
| CORRESPONDING WALSH SEQUENCE | w1 | w1 | w1 | w2 | w2 | w2 | w2 | w2 |

SAME SIGN w1 : 3 PIECES < INVERTED SIGN w2 : 5 PIECES

FIG.16

| CYCLIC SHIFT AMOUNT REPORTED FROM BASE STATION | 0 | 2 | 3 | 4 | 6 | 8 | 9 | 10 |
|---|---|---|---|---|---|---|---|---|
| CORRESPONDING WALSH SEQUENCE | w2 | w1 | w2 | w1 | w2 | w2 | w1 | w2 |

DIFFERENT WALSH SIGNS     DIFFERENT WALSH SIGNS

FIG.17

| CYCLIC SHIFT AMOUNT REPORTED FROM BASE STATION | 0 | 2 | 3 | 4 | 6 | 8 | 9 | 10 |
|---|---|---|---|---|---|---|---|---|
| CORRESPONDING WALSH SEQUENCE | w2 | w2 | w1 | w2 | w2 | w2 | w1 | w2 |

DIFFERENT WALSH SIGNS

DIFFERENT WALSH SIGNS

FIG.18

| CYCLIC SHIFT AMOUNT REPORTED FROM BASE STATION | 0 | 2 | 3 | 4 | 6 | 8 | 9 | 10 |
|---|---|---|---|---|---|---|---|---|
| CORRESPONDING WALSH SEQUENCE | w1 | w1 | w2 | w1 | w1 | w1 | w2 | w1 | w1 IS ASSOCIATED WITH CYCLIC SHIFT AMOUNTS 0 AND 6 w2 IS ASSOCIATED WITH CYCLIC SHIFT AMOUNTS 3 AND 9

DIFFERENT WALSH SIGNS

DIFFERENT WALSH SIGNS

FIG.19

| STREAM NUMBER (STREAM #) | CYCLIC SHIFT AMOUNT | |
|---|---|---|
| | PATTERN 1 | PATTERN 2 |
| 0 | Δ0 (REPORTED) | Δ0 (REPORTED) |
| 1 | Δ0+6 (=Δ1) | Δ0+6 (=Δ1) |
| 2 | Δ0+3 (=Δ2) | Δ0+9 (=Δ2) |
| 3 | Δ0+9 (=Δ3) | Δ0+3 (=Δ3) |

FIG.20

| CYCLIC SHIFT AMOUNT REPORTED FROM BASE STATION | 0 | (1) | 2 | 3 | 4 | (5) | 6 | (7) | 8 | 9 | 10 | (11) |
|---|---|---|---|---|---|---|---|---|---|---|---|---|
| CORRESPONDING WALSH SEQUENCE | w1 | (w1) | w2 | w2 | w1 | (w2) | w1 | (w1) | w2 | w2 | w1 | (w2) |

FIG.21

| | | | | | | | OPERATING SEQUENCE IDENTIFICATION TABLE | | | |
|---|---|---|---|---|---|---|---|---|---|---|
| FIRST STREAM | CYCLIC SHIFT AMOUNT REPORTED FROM BASE STATION | 0 | 2 | 3 | 4 | 6 | 8 | 9 | 10 |
| | CORRESPONDING WALSH SEQUENCE | w1 | w2 | w2 | w1 | w1 | w2 | w2 | w1 |
| | | → | → | → | → | → | → | → | → |
| SECOND STREAM | SET CYCLIC SHIFT AMOUNT | 6 | 8 | 9 | 10 | 0 | 2 | 3 | 4 |
| | CORRESPONDING WALSH SEQUENCE | w1 | w2 | w2 | w1 | w1 | w2 | w2 | w1 |
| THIRD STREAM | SET CYCLIC SHIFT AMOUNT | 3 | 5 | 6 | 7 | 9 | 11 | 0 | 1 |
| | CORRESPONDING WALSH SEQUENCE | w2 | w2 | w1 | w1 | w2 | w2 | w1 | w1 |
| FOURTH STREAM | SET CYCLIC SHIFT AMOUNT | 9 | 11 | 0 | 1 | 3 | 5 | 6 | 7 |
| | CORRESPONDING WALSH SEQUENCE | w2 | w2 | w1 | w1 | w2 | w2 | w1 | w1 |

FIG.22

TERMINAL STATION APPARATUS, BASE STATION APPARATUS, TRANSMISSION METHOD AND CONTROL METHOD

BACKGROUND

Technical Field

The present invention relates to a terminal station apparatus, a base station apparatus, a transmission method and a control method.

Description of the Related Art

3GPP LTE (3rd Generation Partnership Project Long-term Evolution, hereinafter referred to as "LTE") uplink uses cyclic shift sequences, which are orthogonal sequences, as pilot signals to reduce interference among sequences. A cyclic shift sequence can be generated by cyclically shifting a pilot sequence by a cyclic shift amount on the time axis. For example, FIG. 1 shows a cyclic shift sequence (m=0) and a cyclic shift sequence (m=1) with pilot sequence length N=12 and cyclic shift amount Δ=6.

In FIG. 1, while the cyclic shift sequence (m=0) is configured in order of a(0) to a(11), the cyclic shift sequence (m=1) is configured, by cyclically shifting the cyclic shift sequence (m=0) by Δ(=6) samples, in order of a(6) to a(11), a(0) to a(5).

The cyclic shift amount is determined by a base station apparatus (hereinafter abbreviated to "base station") and reported from the base station to a terminal station apparatus (hereinafter abbreviated to "terminal") per scheduling (per subframe). Eight types "0, 2, 3, 4, 6, 8, 9, 10" (3 bits) are defined for reporting the cyclic shift amount. These correspond to a cyclic shift amount of "0, 2, 3, 4, 6, 8, 9, 10"×symbol length/12 (ms).

Since sequences can be separated with low inter-sequence interference by assigning cyclic shift sequences of different cyclic shift amounts to different terminals, cyclic shift sequences are used for pilot signal transmission in MU-MIMO (Multiple User-Multiple Input Multiple Output). In MU-MIMO, a plurality of terminals transmit data signals at the same time and the same frequency, spatially multiplex the data signals and thereby improve system throughput. At this time, it is also preferable that a plurality of terminals transmit pilot signals at the same time and the same frequency from the standpoint of frequency utilization efficiency. Therefore, cyclic shift sequences, which are orthogonal sequences, for pilot signals and the cyclic shift sequences are transmitted at the same time and the same frequency. The reception side can separate pilot signals using the nature of orthogonal sequences, and can thereby accurately estimate a channel state of each terminal.

On the other hand, in LTE-Advanced (hereinafter referred to as "LTE-A") uplink, studies are being carried out on supporting SU-MIMO (Single User-Multiple Input Multiple Output) to improve throughput, whereby one terminal transmits data signals from a plurality of antenna ports at the same time and the same frequency and spatially multiplexes the data signals using virtual communication channels (hereinafter referred to as "streams") in the space.

Here, the "antenna port" refers to a logical antenna (antenna group) made up of one or a plurality of physical antennas. That is, the antenna port does not always refer to one physical antenna, but may also refer to an array antenna made up of a plurality of antennas. For example, the antenna port may be made up of a plurality of physical antennas and defined as a minimum unit whereby a base station or terminal can transmit different pilot signals. Furthermore, the antenna port may also be defined as a minimum unit for multiplying a weight of a precoding vector. Hereinafter, a case will be described as an example where an "antenna port" and a physical antenna have a one-to-one correspondence for simplicity of explanation.

SU-MIMO requires pilot signals for each stream and studies are being carried out on code-multiplexing pilot signals of each stream using a cyclic shift sequence, which is an orthogonal sequence, for the purpose of reducing inter-sequence interference.

Here, in an ideal environment in which there is no channel variation, a cyclic shift sequence is an orthogonal sequence and no inter-sequence interference occurs. On the other hand, in a real environment with a channel variation, complete orthogonality is not established and a certain degree of inter-sequence interference occurs. Especially when the number of streams increases and the cyclic shift sequence multiplexing number increases, inter-sequence interference also increases. Therefore, in LTE-A, studies are being carried out on reducing inter-sequence interference using a Walsh sequence as well as cyclic shift sequences adopted in LTE.

In multiplexing using Walsh sequences, pilot signals of a first slot (slot #1) and a second slot (slot #2) making up a subframe are multiplied by Walsh sequence w1=[1 1] or Walsh sequence w2=[1−1] (see FIG. 2). That is, Walsh sequence w1 uses pilot signals similar to those conventional ones in first and second slots and Walsh sequence w2 uses pilot signals similar to those conventional ones in the first slot and uses pilot signals with an inverted phase (180 degree rotation) in the second slot.

As a method of reporting a cyclic shift amount, in LTE, the base station reports in three bits using a control information channel (Physical Downlink Control Channel, PDCCH) to be reported to each terminal per scheduling. Furthermore, in LTE-A, studies are being carried out on adding one bit indicating whether a Walsh sequence of each terminal is w1 or w2 using a control information channel (PDCCH), the base station reporting the Walsh sequence to each terminal and each terminal switching between the Walsh sequences.

Furthermore, in order to reduce inter-sequence interference of cyclic shift sequences between streams in SU-MIMO, Walsh sequence w1 is used for pilot signals of odd-numbered streams and Walsh sequence w2 is used for pilot signals of even-numbered streams (see FIG. 3).

Here, the "stream number" is a number indicating order in which data is assigned. For example, when data is transmitted with only one stream, suppose a stream transmitted from one antenna port is stream #0 and when data is transmitted with two streams, the stream transmitted from an antenna port different from the above-described port is stream #1. By setting different Walsh sequences depending on whether a stream number is an odd number or even number, it is possible to reduce inter-sequence interference between pilot signals of neighboring streams (see Non-Patent Literature 1). Furthermore, since there is no need for reporting a bit indicating a Walsh sequence, which will be used in the second (stream #1) and subsequent streams, the amount of reporting the cyclic shift amount can be reduced.

CITATION LIST

Non-Patent Literature

Non-Patent Literature 1: R1-091772: Reference Signal structure for LTE-Advanced UL SU-MIMO, 3GPP TSG RAN WG1 Meeting #57, San Francisco, USA, May 4th-8th, 2009

BRIEF SUMMARY

Technical Problem

However, when simultaneous application of SU-MIMO and MU-MIMO is considered aiming at a further throughput improvement, inter-sequence interference occurs between pilot signals among terminals in addition to inter-sequence interference between a plurality of pilot signals used by the same terminal. For example, as shown in FIG. 4, when the first terminal (UE (User Equipment)#1) uses Walsh sequence w1 in a first stream (stream #0) and uses Walsh sequence w2 in a second stream (stream #1), the second terminal (UE#2) uses Walsh sequence w1 in the first stream (stream #0), the first stream of the first terminal receives inter-sequence interference from two pilot signals; the second stream of the first terminal and the first stream of the second terminal. Furthermore, as shown in FIG. 5, when the first terminal and the second terminal have different transmission bandwidths, inter-sequence interference further increases.

For such a situation in which both SU-MIMO and MU-MIMO are applied, the prior art cannot sufficiently reduce inter-sequence interference.

It is an object of the present invention to reduce inter-sequence interference in pilot signals between terminals while suppressing inter-sequence interference in a plurality of pilot signals used by the same terminal even when SU-MIMO and MU-MIMO are simultaneously applied.

Solution to Problem

A terminal station apparatus according to the present invention includes a reception section that receives assignment control information reported with downlink resources, a determining section that determines Walsh sequences of first and second stream groups at least one of which includes a plurality of streams based on the assignment control information; a formation section that forms a transmission signal by spreading each stream included in the first and second stream groups using the determined Walsh sequences and a transmission section that transmits the formed transmission signal, wherein mutually orthogonal Walsh sequences are set in the first and second stream groups respectively and users are assigned in the stream group units.

A base station apparatus according to the present invention includes a control section that sets mutually orthogonal Walsh sequences in first and second stream groups at least one of which includes a plurality of streams and assigns users in the stream group units and a transmission section that transmits assignment control information indicating the Walsh sequence set in the first or second stream group.

A transmission method according to the present invention includes a reception step of receiving assignment control information transmitted with downlink resources, a determining step of determining Walsh sequences of first and second stream groups at least one of which includes a plurality of streams, based on the assignment control information, a forming step of forming a transmission signal by spreading streams included in the first or second stream group using the determined Walsh sequences and a transmission step of transmitting the formed transmission signal, wherein mutually orthogonal Walsh sequences are set in the first and second stream groups respectively and users are assigned in the stream group units.

A control method according to the present invention includes a control step of setting mutually orthogonal Walsh sequences in first and second stream groups, at least one of which includes a plurality of streams and assigning users in the stream group units, and a transmission step of transmitting assignment control information indicating the Walsh sequences set in the first or second stream group.

Advantageous Effects of Invention

According to the present invention, it is possible to reduce inter-sequence interference in pilot signals between terminals while suppressing inter-sequence interference in a plurality of pilot signals used by the same terminal to a low level even when SU-MIMO and MU-MIMO are simultaneously applied.

BRIEF DESCRIPTION OF THE SEVERAL VIEWS OF THE DRAWINGS

FIG. 3 is a diagram illustrating a correspondence relationship between a stream number and a Walsh sequence;

FIG. 8 is a diagram illustrating an example of a correspondence relationship between a stream number and a Walsh sequence;

FIG. 10 is a diagram illustrating another example of a correspondence relationship between a stream number and a Walsh sequence;

FIG. 11 is a diagram illustrating an example of a correspondence relationship between a stream number and a cyclic shift amount;

FIG. 12 is a diagram illustrating an example of an operating sequence identification table;

FIG. 13 is a diagram illustrating another example of an operating sequence identification table;

FIG. 14 is a diagram illustrating further candidates for pairs of a cyclic shift amount and a Walsh sequence;

FIG. 15 is a diagram illustrating advantages when an interval between cyclic shift amounts in first and second streams is set to a maximum;

FIG. 16 is a diagram illustrating candidates for pairs of a cyclic shift amount and a Walsh sequence;

FIG. 17 is a diagram illustrating other candidates for pairs of a cyclic shift amount and a Walsh sequence;

FIG. 18 is a diagram illustrating still further candidates for pairs of a cyclic shift amount and a Walsh sequence;

FIG. 19 is a diagram illustrating still further candidates for pairs of a cyclic shift amount and a Walsh sequence;

FIG. 20 is a diagram illustrating an example of a correspondence relationship between a stream number and a cyclic shift amount;

FIG. 21 is a diagram illustrating another example of an operating sequence identification table according to Embodiment 3; and FIG. 22 is a diagram illustrating a correspondence relationship between a cyclic shift amount and a Walsh sequence set in second to fourth streams.

DETAILED DESCRIPTION

Hereinafter, embodiments of the present invention will be described in detail with reference to the accompanying drawings.

Embodiment 1

Viewpoints of the present invention will be described first, before describing a more specific configuration and operation of an embodiment.

In SU-MIMO, one terminal simultaneously transmits data signals using a plurality of streams. Here, suppose "streams" are signals transmitted from antenna ports associated with data signals or pilot signals (or communication channel in the space). Streams are also called "layers." Furthermore, in vectors (precoding vectors) used for weight control under study for demodulation pilot signals on an LTE-A uplink, streams and precoding vectors are associated in a one-to-one correspondence.

On the other hand, in MU-MIMO, a plurality of terminals transmit data signals with one or a plurality of streams simultaneously.

At this time, in SU-MIMO, inter-sequence interference of pilot signals increases as the number of streams per terminal increases, while in MU-MIMO, inter-sequence interference of pilot signals increases as the number of streams per terminal or the number of spatially multiplexed terminals increases.

Figure 1:
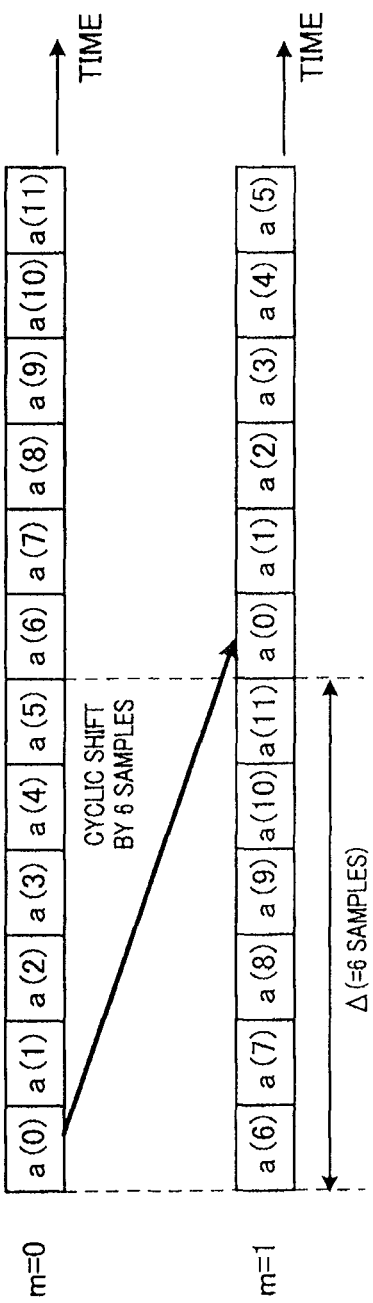
FIG. 1 is a diagram illustrating a cyclic shift sequence (m=0, 1) when cyclic shift amount $\Delta=6$.
Figure 2:
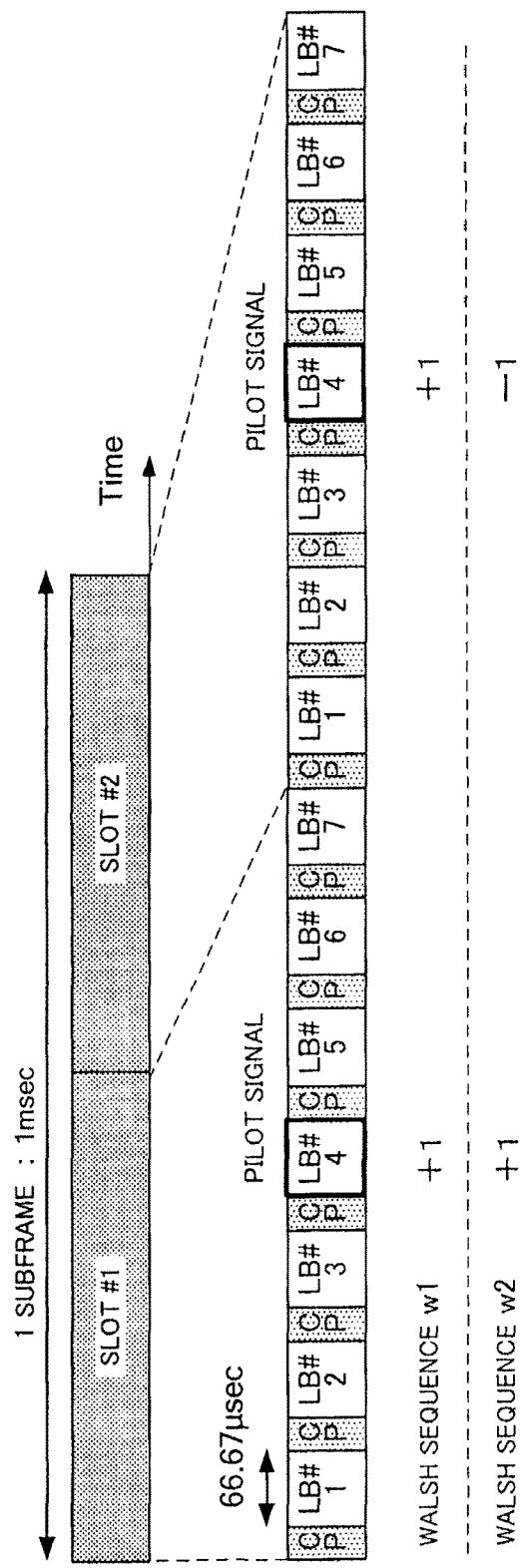
FIG. 2 is a diagram illustrating a multiplexing method using Walsh sequences.
Figure 4:
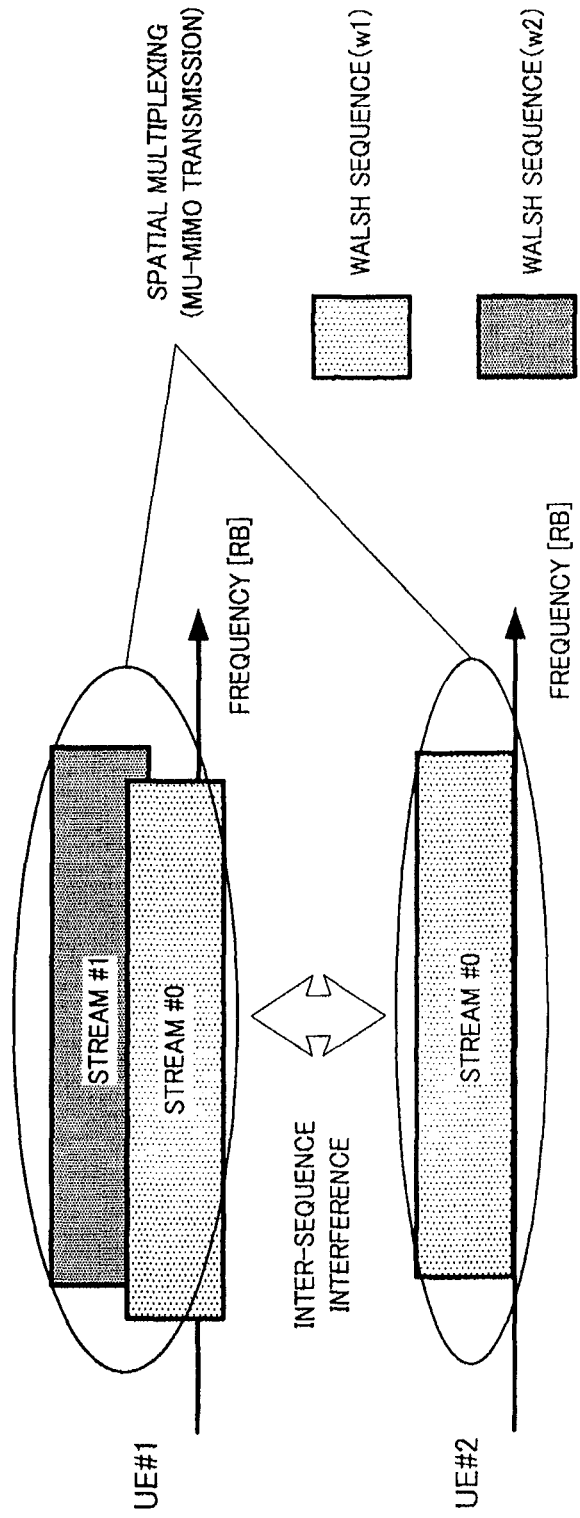
FIG. 4 is a diagram illustrating inter-sequence interference that occurs between terminals in MU-MIMO.
Figure 5:
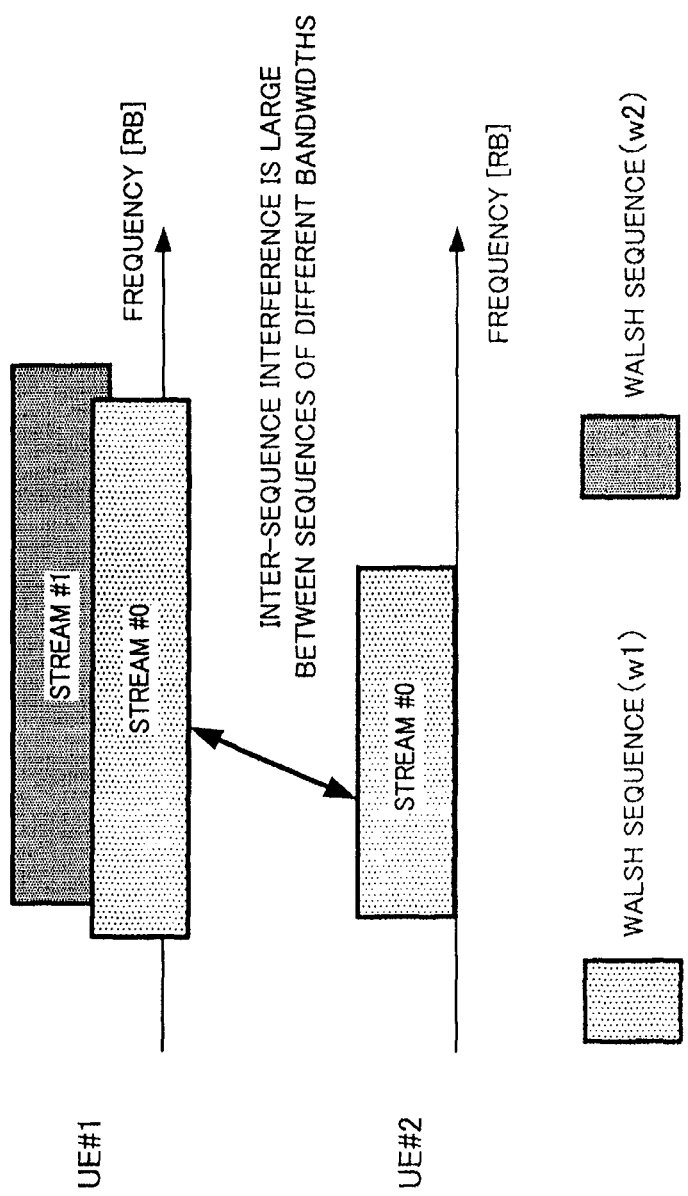
FIG. 5 is a diagram illustrating inter-sequence interference that occurs between terminals when transmission bandwidths are different in MU-MIMO.
Figure 6:
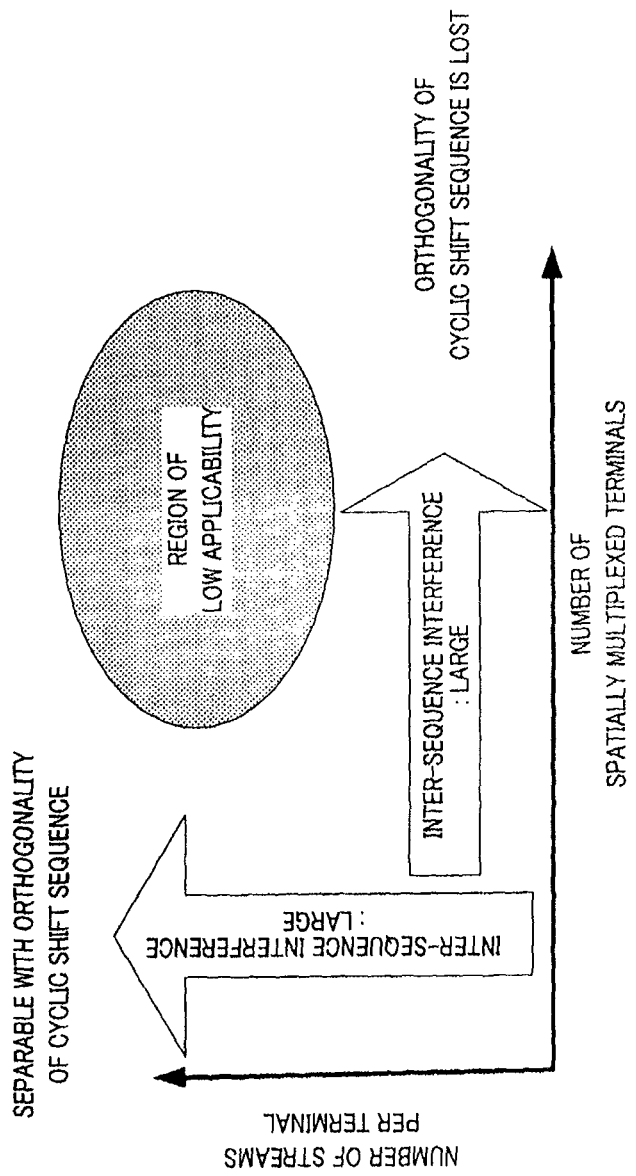
FIG. 6 is a diagram illustrating the applicability in SU-MIMO and MU-MIMO.

Therefore, in a situation in which both the number of streams per terminal and the number of spatially multiplexed terminals are large, inter-signal interference of data signals and pilot signals increases and the error rate deteriorates considerably. Therefore, the possibility that such a situation may be used in a real environment is low (see FIG. 6) and even if performance is improved for such a situation, contribution of the amount of performance improvement to the entire system is considered small.

Furthermore, in LTE-A uplink, studies are being carried out on SU-MIMO transmission using four antennas for transmission and reception respectively as a spatial multiplexing number which can be realized in a real environment, that is, MIMO transmission having a maximum number of streams of 4. Based on SU-MIMO, a maximum number of streams of 4 is likewise a spatial multiplexing number that can be realized in a real environment also in MU-MIMO transmission. Therefore, a case will be studied below as an example where the number of streams per terminal in SU-MIMO is a maximum of 4 or less or the total number of streams per terminal in MU-MIMO is 4 or less.

[Configuration of Base Station Apparatus]

Figure 7:
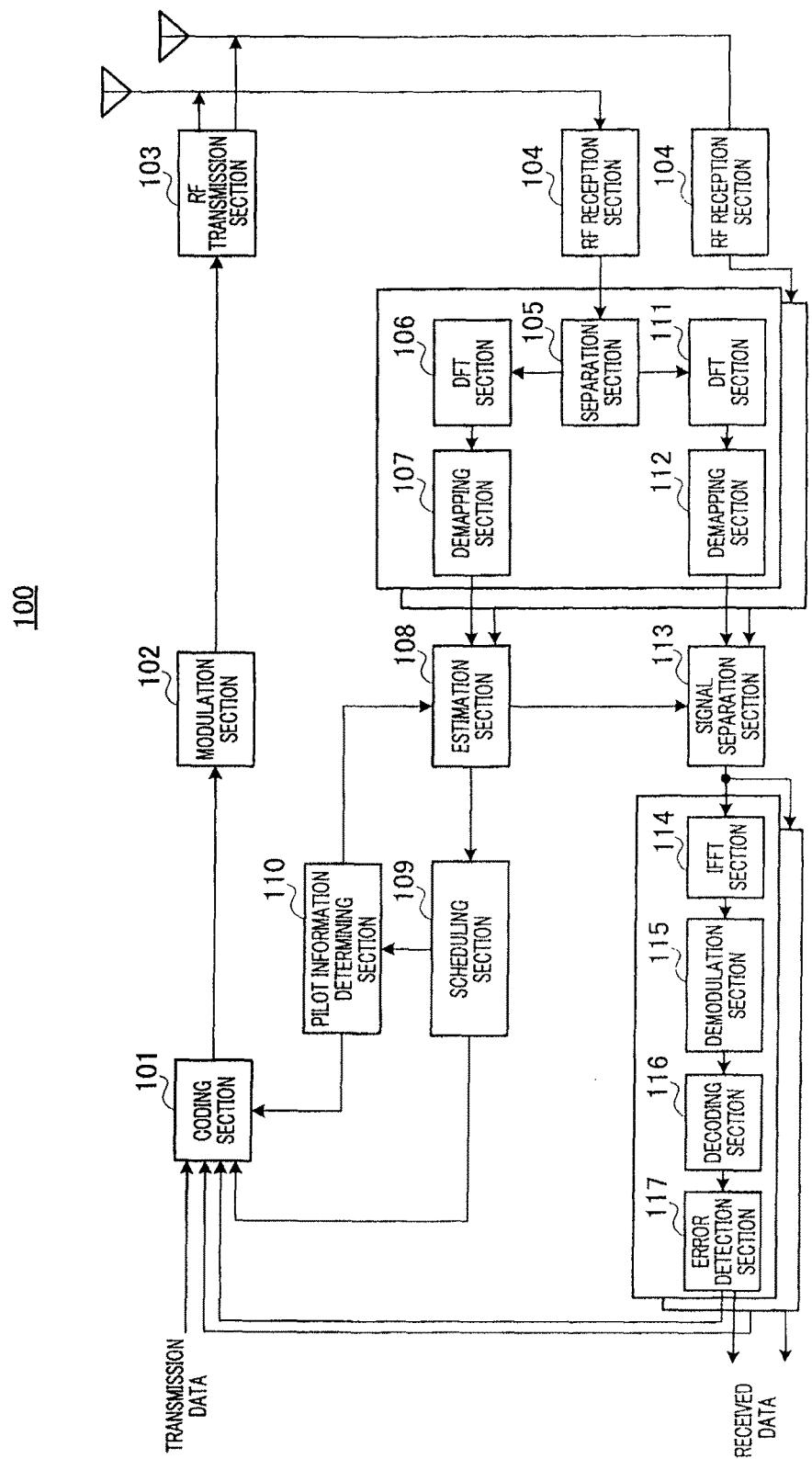
FIG. 7 is a diagram illustrating a configuration of a base station according to Embodiment 1 of the present invention.

FIG. 7 is a diagram illustrating a configuration of base station 100 according to the present embodiment.

Coding section 101 receives transmission data (downlink data), a response signal (ACK/NACK signal) inputted from error detection section 117, resource assignment information of each terminal inputted from scheduling section 109, control information indicating MCS (Modulation Coding Scheme) or the like, weight control information for controlling transmission power/weight, information on cyclic shift amounts, information indicating a correspondence relationship between a cyclic shift amount (or stream number) and a Walsh sequence or the like as input. Information on the correspondence relationship between a stream number and a Walsh sequence will be described later.

Assignment control information is composed of a response signal, resource assignment information, control information, weight control information, information on cyclic shift amounts, information on the correspondence relationship between a stream number and a Walsh sequence or the like. Coding section 101 codes the transmission data and assignment control information and outputs the coded data to modulation section 102. The information on the cyclic shift amount, assignment control information including information indicating the correspondence relationship between a stream number and a Walsh sequence are transmitted per scheduling from RF (Radio Frequency) transmission section 103, which will be described later.

Modulation section 102 modulates the coded data inputted from coding section 101 and outputs the modulated signal to RF transmission section 103.

RF transmission section 103 applies transmission processing such as D/A (Digital to Analog) conversion, up-conversion, amplification to the signal inputted from modulation section 102 and transmits by radio the signal subjected to the transmission processing from one or more antennas to each terminal.

RF reception section 104 applies reception processing such as down-conversion, A/D (Analog to Digital) conversion to a signal received via an antenna from each terminal and outputs the signal subjected to the reception processing to separation section 105.

Separation section 105 separates the signal inputted from RF reception section 104 into a pilot signal and a data signal. Separation section 105 outputs the pilot signal to DFT (discrete Fourier transform) section 106 and outputs the data signal to DFT section 111.

DFT section 106 applies DFT processing to the pilot signal inputted from separation section 105 and converts the signal from a time-domain signal to frequency-domain signal. DFT section 106 then outputs the pilot signal converted to the frequency-domain signal to demapping section 107.

Demapping section 107 extracts a pilot signal of a portion corresponding to a transmission band of each terminal from the frequency-domain pilot signal inputted from DFT section 106. Demapping section 107 then outputs each extracted pilot signal to estimation section 108.

Estimation section 108 determines a sequence of pilot signals received, based on a cyclic shift amount and a Walsh sequence (w1 or w2) inputted from pilot information determining section 110 as information on the sequence of pilot signals.

Furthermore, estimation section 108 extracts a desired pilot signal from the pilot signals inputted from demapping section 107 using information on the sequence of the pilot signals and acquires estimate values by estimating a frequency-domain channel state (channel frequency response) and reception quality. Estimation section 108 then outputs the estimate value of the channel frequency response to signal separation section 113 and outputs the estimate value of the reception quality to scheduling section 109.

Scheduling section 109 schedules assignment of a transmission signal transmitted by each terminal to a transmission band (frequency resource) according to the estimate value of the reception quality inputted from estimation section 108. Scheduling section 109 also determines transmission power/weight of the transmission signal transmitted by each terminal. Scheduling section 109 outputs assignment control information (e.g., resource assignment information, control information) indicating the scheduling result and weight control information for controlling transmission power/weight to coding section 101 and outputs resource assignment information to pilot information determining section 110.

Pilot information determining section 110 determines a transmission band of a pilot signal, based on the resource assignment information inputted from scheduling section 109. Furthermore, pilot information determining section 110 stores a plurality of correspondence relationships between a stream number and a Walsh sequence and selects a correspondence relationship between a stream number and a Walsh sequence that can reduce inter-sequence interference between pilot signals from among the plurality of correspondence relationships.

FIG. 8 is a diagram illustrating an example of a correspondence relationship between a stream number and a Walsh sequence stored in pilot information determining section 110. In the example shown in FIG. 8, two patterns; pattern A and pattern B are shown as the correspondence relationship between a stream number and a Walsh sequence.

Pilot information determining section 110 assigns, in the case of MU-MIMO, for example, pattern A and pattern B to a terminal to be multiplexed and outputs information indicating a correspondence relationship between a stream number indicating pattern A or pattern B and a Walsh sequence to estimation section 108 and coding section 101. Since different Walsh sequences are associated with the same stream number in pattern A and pattern B, it is possible to reduce inter-sequence interference between terminals by assigning pattern A and pattern B to each terminal.

Furthermore, pilot information determining section 110 determines a cyclic shift amount of each cyclic shift sequence capable of reducing inter-sequence interference between pilot signals in addition to the correspondence relationship. Pilot information determining section 110 assigns a cyclic shift sequence having a large difference in the cyclic shift amount capable of reducing inter-sequence interference to each stream. Pilot information determining section 110 then outputs information regarding the determined cyclic shift amount of the cyclic shift sequence to estimation section 108 and coding section 101.

On the other hand, DFT section 111 applies DFT processing to the data signal inputted from separation section 105 and converts the data signal from a time-domain signal to a frequency-domain signal. DFT section 111 outputs the data signal converted to the frequency-domain signal to demapping section 112.

Demapping section 112 extracts a data signal of a portion corresponding to the transmission band of each terminal from the signal inputted from DFT section 111. Demapping section 112 then outputs the each extracted signal to signal separation section 113.

Signal separation section 113 weights and combines the data signals inputted from demapping section 112 according to transmission power/weight using the estimate value of the channel frequency response inputted from estimation section 108 and thereby separates the data signal into data signals of the respective streams. Signal separation section 113 then outputs the data signals subjected to equalization processing to IFFT (Inverse Fast Fourier Transform) section 114.

IFFT section 114 applies IFFT processing to the data signals inputted from signal separation section 113. IFFT section 114 then outputs the signal subjected to the IFFT processing to demodulation section 115.

Demodulation section 115 applies demodulation processing to the signal inputted from IFFT section 114 and outputs the signal subjected to the demodulation processing to decoding section 116.

Decoding section 116 applies decoding processing to the signal inputted from demodulation section 115 and outputs the signal subjected to the decoding processing (decoded bit sequence) to error detection section 117. Error detection section 117 performs error detection on the decoded bit sequence inputted from decoding section 116. For example, error detection section 117 performs error detection using a CRC (Cyclic Redundancy Check).

Error detection section 117 generates, when an error is detected in the decoded bit as a result of error detection, a NACK signal as a response signal, and generates, when no error is detected in the decoded bit, an ACK signal as a response signal. Error detection section 117 then outputs the response signal generated to coding section 101. Furthermore, when no error is detected in the decoded bit, error detection section 117 outputs the data signal as the received data.

[Configuration of Terminal Station Apparatus]

Figure 9:
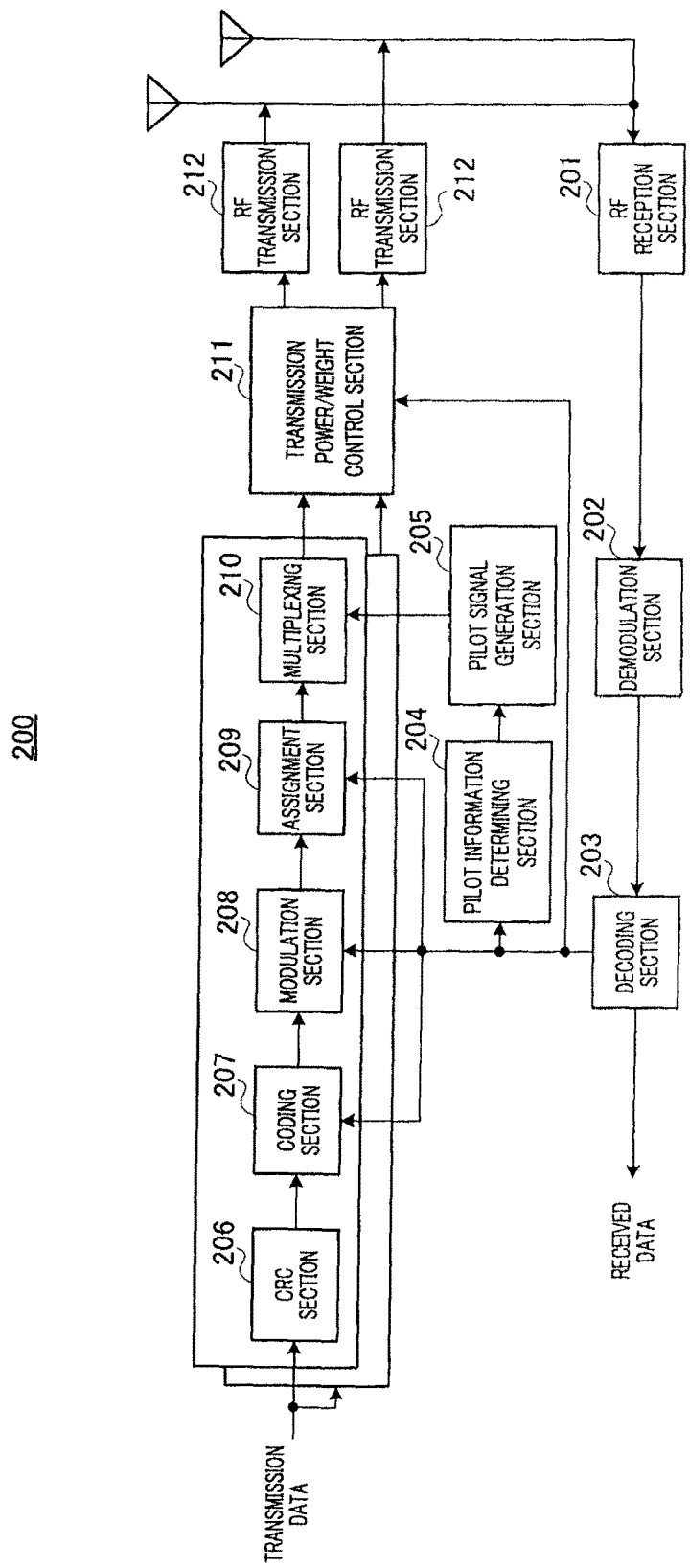
FIG. 9 is a diagram illustrating a configuration of a terminal according to Embodiment 1.

FIG. 9 is a diagram illustrating terminal 200 according to the present embodiment.

RF reception section 201 applies reception processing such as down-conversion, A/D conversion to a signal from the base station received via an antenna and outputs the signal subjected to the reception processing to demodulation section 202.

Demodulation section 202 applies equalization processing and demodulation processing to the signal inputted from RF reception section 201 and outputs the signal subjected to the processing to decoding section 203.

Decoding section 203 applies decoding processing to the signal inputted from demodulation section 202 and extracts received data and assignment control information from the signal subjected to the decoding processing. Here, the assignment control information includes a response signal (ACK signal/NACK signal), resource assignment information, control information, weight control information, information on cyclic shift amounts and information indicating a correspondence relationship between a stream number and a Walsh sequence. Of the extracted assignment control information, decoding section 203 outputs the resource assignment information and control information to coding section 207, modulation section 208 and assignment section 209 and outputs the weight control information to transmission power/weight control section 211 and outputs the information regarding the cyclic shift amounts and information indicating the correspondence relationship between a stream number and a Walsh sequence to pilot information determining section 204.

Pilot information determining section 204 stores a plurality of correspondence relationships (patterns) between a stream number and a Walsh sequence and determines the correspondence relationship between a stream number and a Walsh sequence, based on the information indicating the correspondence relationship between a stream number and a Walsh sequence inputted from decoding section 203. The information indicating the correspondence relationship between a stream number and a Walsh sequence is not limited to information reporting pattern A or pattern B, but may be information indicating whether the Walsh sequence used in stream 0 is w1 or w2.

For example, when pattern A and pattern B as shown in FIG. 8 as the correspondence relationship between a stream number and a Walsh sequence are stored, pilot information determining section 204 determines a Walsh sequence used for each stream, based on information indicating the correspondence relationship (information on pattern A or pattern B) inputted from decoding section 203.

Furthermore, pilot information determining section 204 determines the cyclic shift amounts of the cyclic shift sequence according to the information on the cyclic shift amounts inputted from decoding section 203. Pilot information determining section 204 then outputs the determined information to pilot signal generation section 205.

Pilot signal generation section 205 generates a pilot signal based on the information on the cyclic shift amounts and Walsh sequences inputted from pilot information determining section 204 and outputs the pilot signal to multiplexing section 210. To be more specific, pilot signal generation section 205 spreads the cyclic shift sequence according to the cyclic shift amount set by pilot information determining section 204 using the Walsh sequence set by pilot information determining section 204 and outputs the spread signal to multiplexing section 210.

CRC section 206 receives divided transmission data as input. CRC section 206 performs CRC coding on the inputted transmission data to generate CRC coded data and outputs the generated CRC coded data to coding section 207.

Coding section 207 codes the CRC coded data inputted from CRC section 206 using the control information inputted from decoding section 203 and outputs the coded data to modulation section 208.

Modulation section 208 modulates the coded data inputted from coding section 207 using the control information inputted from decoding section 203 and outputs the modulated data signal to assignment section 209.

Assignment section 209 assigns the data signal inputted from modulation section 208 to frequency resources (RBs), based on the resource assignment information inputted from decoding section 203. Assignment section 209 outputs the data signal assigned to RBs to multiplexing section 210.

Multiplexing section 210 time-multiplexes the data signal and the pilot signal inputted from assignment section 209 and outputs the multiplexed signal to transmission power/weight control section 211.

Transmission power/weight control section 211 determines transmission power/weight based on the weight control information inputted from decoding section 203, multiplies each multiplexed signal inputted from multiplexing section 210 by the transmission power/weight and outputs the multiplexed signal after the multiplication to RF transmission section 212.

RF transmission section 212 applies transmission processing such as D/A conversion, up-conversion, amplification to the multiplexed signal inputted from transmission power/weight control section 211 and transmits by radio the signal after the transmission processing to the base station from an antenna.

Next, the correspondence relationship between a stream number and a Walsh sequence will be described.

Here, in SU-MIMO, since one terminal transmits a plurality of streams, the same transmission bandwidths (bandwidths for transmitting data signal) of the respective streams are set to the same value. This is because the amount of reporting control information of resource assignment can be reduced by setting the same transmission bandwidth for one terminal. Thus, in SU-MIMO since the transmission bandwidth is common among sequences, it is possible to maintain orthogonality among sequences through the cyclic shift sequences, provides a high effect of reducing inter-sequence interference and produces less inter-sequence interference.

On the other hand, in MU-MIMO, a transmission bandwidth is reported to each terminal, and each terminal can thereby set a different transmission bandwidth and set a transmission bandwidth adapted to a channel situation of each terminal. Therefore, when transmission bandwidths are different among sequences, the cyclic shift sequence alone cannot maintain orthogonality among sequences, provides a lower effect of inter-sequence interference and produces large inter-sequence interference.

Therefore, hereinafter the number of terminals in MU-MIMO is assumed to be two in agreement with the number of terminals that can be generated with a Walsh sequence of a sequence length of 2 (length that can be realized in an LTE subframe configuration). Furthermore, a case will be assumed where each Walsh sequence is associated with two streams (=maximum number of streams/number of Walsh sequences under study in LTE-A) so that inter-sequence interference can be suppressed to a low level from the standpoint including inter-sequence interference in SU-MIMO in addition to MU-MIMO. An appropriate correspondence relationship between a stream number and a Walsh sequence in this case will be studied.

In the present embodiment, terminals are configured to use mutually orthogonal Walsh sequences in MU-MIMO. The Walsh sequence can maintain orthogonality even when transmission bandwidths are different among sequences.

FIG. 8 is a diagram illustrating an example of correspondence between a stream number and a Walsh sequence. In MU-MIMO having two or fewer streams to be assigned to each terminal, it is possible to use Walsh sequences differing among terminals, and thereby maintain orthogonality among sequences. As described above, the stream number is a number indicating the order in which data is assigned.

When the example of correspondence shown in FIG. 8 is used, in pattern A, Walsh sequence w1 is set in a first stream group made up of a first stream (stream #0) and second stream (stream #1) and Walsh sequence w2 is set in a second stream group made up of a third stream (stream #2) and fourth stream (stream #3). On the other hand, in pattern B, Walsh sequence w2 is set in the first stream group and Walsh sequence w1 is set in the second stream group.

Here, as one method, each terminal determines a pattern based on control information of pattern A or pattern B and in SU-MIMO, the first stream group and second stream group in the determined pattern are assigned to the terminal. In MU-MIMO, the first stream group in the determined pattern is assigned to the first terminal and the second stream group is assigned to the second terminal. Thus, mutually orthogonal Walsh sequences are set in the first and second stream groups at least one of which includes a plurality of streams and users are assigned in stream group units.

Furthermore, as another method, each terminal determines a pattern based on control information of pattern A or pattern B, and when the number of streams used by the terminal for data transmission is equal to or fewer than the number of streams included in the first stream group, each terminal uses only the sequence assigned to the first stream group in the determined pattern, whereas when the number of streams is greater than the number of streams included in the stream group, each terminal uses the sequences assigned to the first and second stream groups.

That is, when the correspondence relationship between a stream number and a Walsh sequence as shown in FIG. 8 is used, pilot information determining section 204 determines to use a Walsh sequence (w1 or w2) reported from the base station for the first stream, determines to use the same Walsh sequence as the Walsh sequence of the first stream for the second stream, and determines to use a Walsh sequence different from the first and second streams in the third and fourth streams.

As the number of streams increases, the separation performance generally deteriorates a great deal, but in SU-MIMO, if the number of streams per terminal is 2 or less, streams can be separated using only cyclic shift sequences while using the same Walsh sequence, and therefore performance deterioration is small.

Thus, when mutually orthogonal Walsh sequences are set in the first and second stream groups, the first and second stream groups where mutually orthogonal Walsh sequences are assigned may be configured of two streams also for the following reasons.

As described above, in LTE-A uplink, as SU-MIMO, studies are being carried out on MIMO transmission with four antennas for transmission and reception respectively, that is, assuming that the maximum number of streams is four. Therefore, if the number of streams included in each stream group is assumed to be 2, Walsh sequences w1 and w2 are associated with two streams each.

Using two cyclic shift sequences corresponding to the maximum difference between the respective cyclic shift amounts in each stream group makes it possible to reduce inter-sequence interference that occurs between streams. Therefore, when the maximum number of streams in MIMO transmission is four, it is ensured that each stream group includes two (=maximum number of streams/Walsh sequences under study in LTE-A) streams. Thus, assigning different Walsh sequences to the respective stream groups makes it possible to reduce inter-sequence interference occurring between streams.

As a result, when SU-MIMO and MU-MIMO are simultaneously applied, it is possible to reduce inter-sequence interference in pilot signals between terminals while suppressing inter-sequence interference in a plurality of pilot signals used by the same terminal to a low level.

It is also assumed in MU-MIMO transmission that the first terminal uses three streams and the second terminal uses one stream.

Thus, the number of streams $N_w$ making up each stream group for assigning mutually orthogonal different Walsh sequences is shared between the base station and terminal. Pilot information determining section 204 may also determine to use a Walsh sequence (w1 or w2) reported from the base station in the first to $N_w$-th streams and use a Walsh sequence different from the Walsh sequence reported by the base station in the $(N_w+1)$-th and subsequent streams. In other words, one terminal station may use one type of Walsh sequence (w1 or w2) in the first to $N_w$-th streams and use one type of Walsh sequence different from the above-described Walsh sequence in the $(N_w+1)$-th and subsequent streams. Whether the first stream is w1 or w2 may be directly reported by the base station or indirectly reported as information of pattern A or pattern B. For example, when two streams are assigned to the terminal, $N_w=2$ may be shared between the base station and terminal, and when three streams are assigned to the terminal, $N_w=3$ may be shared between the base station and terminal.

Thus, the correspondence relationship (pattern) between a stream number and a Walsh sequence is changed according to $N_w$ so as to use, for example, the correspondence relationship in FIG. 8 when $N_w=2$, and use the correspondence relationship in FIG. 10 when $N_w=3$. When the number of streams is four and $N_w=4$ is assumed, the same Walsh sequence is used in all streams.

The $N_w$ value corresponding to the number of streams of each terminal in MU-MIMO may be reported through signaling. At this time, in SU-MIMO, the same Walsh sequence as that of the first stream is used in the first to $N_w$-th streams and a Walsh sequence different from the Walsh sequence of the first stream is used in the $(N_w+1)$-th and subsequent streams. This allows the number of streams using the same Walsh sequence to be arbitrarily changed. Furthermore, the above-described technique and the conventional technique (FIG. 3) may be changed through signaling.

Also when the first terminal uses three streams and the second terminal uses one stream, mutually orthogonal Walsh sequences w1 and w2 are set for the first stream group made up of three streams and for the second stream group made up of one stream group. Assigning the first stream group to the first terminal and assigning the second stream group to the second terminal causes the first terminal and the second terminal to use different Walsh sequences, which reduces inter-sequence interference between terminals. Furthermore, assigning the first stream group of pattern A to the first terminal and assigning the first stream group of pattern B to the second terminal causes the first terminal and the second terminal to use different Walsh sequences, which reduces inter-sequence interference between terminals. Thus, when MU-MIMO where the number of streams of each terminal is three or more is assumed, it is possible to reduce inter-sequence interference between terminals using a Walsh sequence similar to that of the first stream also for the Walsh sequence used for the third stream.

Examples of the signaling method for changing $N_w$ include (a) a method of reporting per scheduling, and (b) a method of reporting at a longer interval than scheduling (Higher Layer Signaling or the like).

Furthermore, $N_w$ may be reported in a terminal-specific (UE Specific) manner or may be reported in a cell-specific (Cell Specific) manner. Furthermore, $N_w$ may be reported implicitly according to the number of the cyclic shift amount. For example, when "0, 2, 3, 4, 6, 8, 9, 10" (that is, "0, 2, 3, 4, 6, 8, 9, 10"×symbol length/12 (ms)) is defined as the cyclic shift amount reported from the base station to the terminal, if any one of cyclic shift amounts "0, 2, 3, 4" is reported, $N_w=2$ is assumed and if any one of cyclic shifts "6, 8, 9, 10" is reported, $N_w=4$ is assumed.

For example, when $N_w=2$, mutually orthogonal Walsh sequences w1 and w2 are set for the first stream group made up of two streams and for the second stream group made up of two stream groups. Furthermore, when $N_w=4$, mutually orthogonal Walsh sequences w1 and w2 are set for the first stream group made up of four streams and for the second stream group made up of 0 stream groups. Then, $N_w$ is changed explicitly or implicitly. That is, the terminal transmits pilot signals of four streams using two types w1 and w2 when $N_w=2$ and transmits pilot signals of four streams using any one of w1 and w2 when $N_w=4$. In other words, Walsh sequences of the same sign are used for the first stream and second stream and Walsh sequences of the same sign as or different sign from that of the first stream depending on the number of streams $N_w$ making up each stream group in the third and subsequent streams.

Thus, the $N_w$ value can be changed through signaling, and it is thereby possible to use the number of streams $N_w$ set according to the separation performance of spatially multiplexed signals in MU-MIMO and flexibly reduce inter-sequence interference.

In the above description, a Walsh sequence is associated with a stream number, but a cyclic shift amount can also be associated with a stream number in addition to a Walsh sequence. For example, as shown in FIG. 11, cyclic shift sequences (here, suppose "0, 1, 2, 3, 4, 5, 6, 7, 8, 9, 10, 11" (that is, "0, 1, 2, 3, 4, 5, 6, 7, 8, 9, 10, 11"×symbol length/12 (ms)) are selectable as the cyclic shift amounts) having a large difference in cyclic shift amounts is assigned to the same Walsh sequence.

To be more specific, when cyclic shift amount Δ0 (Δ0<12) used for the first stream (stream #0) is reported from the base station, cyclic shift amount Δ1 used for the second stream (stream #1) is assumed to be (Δ0+6)mod12 and the cyclic shift amount is assumed to be a ½ symbol length (see pattern 1 and pattern 2 in FIG. 11). Furthermore, suppose cyclic shift amount Δ2 used for the third stream (stream #2) is (Δ0+3)mod12, the cyclic shift amount is a ¼ symbol length, cyclic shift amount Δ3 used for the fourth stream (stream #3) is (Δ0+9)mod12 and the cyclic shift amount is a ¾ symbol length (see pattern 1 in FIG. 11). Cyclic shift amount Δ2 used for the third stream (stream #2) may be (Δ0+9)mod12 and cyclic shift amount Δ3 used for the fourth stream (stream #3) may be (Δ0+3)mod12 (see pattern 2 in FIG. 11).

This allows the difference in the cyclic shift amount to be a ½ symbol length not only between sequences using Walsh sequence w1 but also between sequences using Walsh sequence w2 and also allows the difference in the cyclic shift amount to be largest, and thereby allows inter-sequence interference to be drastically reduced. On the other hand, the difference in the cyclic shift amount is set to a ¼ symbol length between different Walsh sequences (w1 and w2) to thereby reduce inter-sequence interference in cyclic shift sequences and further reduce inter-sequence interference in different Walsh sequences.

Thus, when the sum of the number of streams per terminal in SU-MIMO and the number of streams of the terminals in MU-MIMO (hereinafter referred to as "number of operating streams") is four, inter-sequence interference can be drastically reduced using "0, 6, 3, 9" (or "0, 6, 9, 3") as the amount of offset of the cyclic shift amount for the first to fourth streams.

When the number of operating streams is three, "0, 6, 3" or "0, 4, 8" may be used as the amount of offset of the cyclic shift amount for the first to third streams. Here, the amount of offset "0, 6, 3" is partially common to the amount of offset "0, 6, 3, 9" applicable to the case where the number of operating streams is four. Therefore, when the number of operating streams is three, it is possible to use part of the processing in the case where the number of operating streams is four by using "0, 6, 3" as the amount of offset of the cyclic shift amount. That is, since the same circuit can be used in the cases where the number of operating streams is three and four, the circuit scale can be reduced. However, when "0, 6, 3" is used as the amount of offset of the cyclic shift amount, the interval of cyclic shift amounts between streams is three. On the other hand, when the number of operating streams is three, if "0, 4, 8" is used as the amount of offset of the cyclic shift amount, the interval of cyclic shift amounts between streams is four and the interval of cyclic shift amounts can be widened to a maximum degree. Therefore, when the number of operating streams is three, using "0, 4, 8" as the amount of offset of the cyclic shift amount has a greater effect of reducing inter-sequence interference than using "0, 6, 3."

As described above, pilot information determining section 204 determines respective Walsh sequences of the first and second stream groups, at least one of which includes a plurality of streams, based on assignment control information and pilot signal generation section 205 spreads each stream included in the first and second stream groups with the determined Walsh sequence and thereby forms a transmission signal. At this time, mutually orthogonal Walsh sequences are set in the first and second stream groups and users are assigned in stream group units.

MODIFICATION EXAMPLE 1

A case has been described above where in MU-MIMO transmission, Walsh sequence w1 is assigned to the first stream group made up of first to third streams and Walsh sequence w2 is assigned to the second stream group made up of only the fourth stream as an example of $N_w$=3.

In this case, in SU-MIMO, the same Walsh sequence w1 is assigned to the first to third streams included in the first stream group, and it is therefore necessary to reduce interference between three sequences using cyclic shift sequences. However, even when $N_w$=3, since the difference in the cyclic shift amount between cyclic shift sequences is sufficiently large, inter-sequence interference can be sufficiently reduced.

Thus, in SU-MIMO, even when the same transmission bandwidth is used between sequences, the difference in the cyclic shift amount between cyclic shift sequences decreases as the number of streams increases and inter-sequence interference between cyclic shift sequences increases. That is, in SU-MIMO, when the number of streams making up a stream group is small, the difference in the cyclic shift amount can be increased and therefore even when the same Walsh sequence is used, inter-sequence interference can be sufficiently reduced only with cyclic shift sequences, whereas when the number of streams making up the stream group is large, the difference in the cyclic shift amount decreases and inter-sequence interference between sequences increases.

Thus, in SU-MIMO, when the number of streams of a stream group is small, Walsh sequences of the same sign are applied and when the number of streams of the stream group is large, Walsh sequences of the same sign or a different sign may also be applied. To be more specific, in SU-MIMO, Walsh sequence w1 or w2 is applied when the number of streams of a stream group is two or fewer, whereas when the number of streams of a stream group is three or more, Walsh sequences w1 and w2 are applied. When the number of streams per terminal is three or more, the first stream group to which Walsh sequence w1 is assigned and the second stream group to which Walsh sequence w2 is assigned are assigned to a single user. That is, in this case, the first and second stream groups for which mutually orthogonal Walsh sequences are set are assigned to a single user.

A case has been described above where the number of streams is four or fewer as an example, but it may also be assumed that the correspondence relationship in the first and subsequent streams is repeated in the fifth and subsequent streams. That is, a Walsh sequence of w1 may be used in the first and fifth streams, the second and sixth streams.

The base station and terminal according to the present invention may also be replaced by the following.

The base station includes pilot information determining section 110 as a setting section that classifies a stream defined in one terminal into a first stream group and a second stream group, and selects and sets a sequence used in the first stream group and the second stream group from a first Walsh sequence or second Walsh sequence for each terminal, pilot information determining section 110 as a control information generation section that generates control information indicating whether the sequence used in the set first stream group is the first Walsh sequence or the second Walsh sequence, and RF transmission section 103 as a transmission section that transmits the control information, wherein pilot information determining section 110 as the setting section assigns different Walsh sequences to the first stream group and the second stream group in each terminal.

The terminal includes RF reception section 201 as a reception section that classifies a stream defined in one terminal into a first stream group and a second stream group, and receives control information indicating whether a sequence used in the first stream group is a first Walsh sequence or a second Walsh sequence, demodulation section 202 and decoding section 203, pilot information determining section 204 as a setting section that assigns a sequence reported by the control information to the first stream group and assigns a sequence different from the sequence reported by the control information to the second stream group based on the control information, pilot signal generation section 205 as a formation section that forms a transmission signal using the set Walsh sequence and RF transmission section 212 as a transmission section that transmits the formed transmission signal, where pilot signal generation section 205 as the formation section:

uses only the sequence assigned to the first stream group when the number of streams used by the terminal for data transmission is equal to or fewer than the number of streams included in the first stream group; and uses the sequence assigned to the first and second stream groups, when the number of streams is greater than the number of streams included in the stream group.

Embodiment 2

Embodiment 1 assumes that information on the correspondence relationship between a stream number and a Walsh sequence and information on the cyclic shift sequences are reported per scheduling. To be more specific, in LTE, the base station selects a cyclic shift amount of each cyclic shift sequence from among eight types (cyclic shift amounts defined in LTE) and reports the selected cyclic shift amount to the terminal using three bits. Furthermore, in LTE-A, studies are being carried out on a base station selecting any one of w1 and w2 as a Walsh sequence and reporting the selected sequence to the terminal using one bit.

Therefore, according to Embodiment 1, the terminal selects a cyclic shift sequence and a Walsh sequence from among 16 types of combinations; eight types of cyclic shift sequences and two types of Walsh sequences. However, in a real environment of LTE-A uplink, the number of streams assumed as the number of streams used in SU-MIMO or MU-MIMO is four at most and it is sufficient that four sequences having little inter-sequence interference be able to be selected as pilot signals. With all these aspects taken into consideration, there are many alternatives (16 types) in selecting a pilot signal sequence with respect to the number of sequences to be code-multiplexed (four types at most).

That is, in consideration of the necessity for providing only four sequences as sequences with less inter-sequence interference, influences of pilot signals on inter-sequence interference are small even when alternatives (degree of freedom) of pilot signals are reduced. In other words, it may be considered unnecessary such flexibility (degree of freedom) that both cyclic shift sequences and Walsh sequences are reported to each terminal per scheduling.

On the other hand, in MU-MIMO, terminals to be spatially multiplexed differ from one scheduling instance to another. Therefore, it is preferable that in MU-MIMO, different Walsh sequences be able to set per scheduling and spatial multiplexing be able to be performed between different terminals per scheduling. In other words, it is preferable that Walsh sequences be able to be adjusted with information reported from the base station per scheduling.

Thus, the present embodiment associates a Walsh sequence with a cyclic shift amount of each cyclic shift sequence used for a first stream and changes a correspondence relationship (pattern) indicating a pair of the cyclic shift amount and Walsh sequence at an interval longer than that of scheduling. That is, the base station reports a cyclic shift amount per scheduling and reports a correspondence relationship (pattern) indicating a pair of a cyclic shift amount and a Walsh sequence at an interval longer than that of scheduling. This causes a reception cycle of a correspondence relationship (pattern) indicating a pair of a cyclic shift amount and a Walsh sequence in the terminal to be longer than a reception cycle of a cyclic shift amount, and can thereby suppress increases in the amount of reporting of Walsh sequences. Furthermore, since the terminal can set Walsh sequence w1 or w2 according to information on the cyclic shift amount reported from the base station per scheduling, it is possible to suppress increases in the amount of reporting of Walsh sequences while maintaining the degree of freedom within which Walsh sequences can be changed per scheduling.

The above-described correspondence relationship may be reported in a manner that differs from one cell to another (cell-specific) or may be reported in a manner that differs from one terminal to another (user specific). In the case of cell-specific reporting, only information common to respective terminals in the cell needs to be reported, and it is thereby possible to reduce the amount of reporting. On the other hand, in the case of user-specific reporting, since association of cyclic shift sequences and Walsh sequences can be set for each terminal, flexibility of sequences assigned to each terminal increases. For example, when a correspondence relationship in which w1 is associated with a cyclic shift sequence of cyclic shift amount 2 is used for the first terminal, and a correspondence relationship in which w2 is associated with a cyclic shift sequence of cyclic shift amount sequence 2 is used for the second terminal, it may be possible to assign cyclic shift sequence 2 to the first and second terminals and perform code multiplexing using Walsh sequences w1 and w2. Furthermore, in this case, it is also possible to reduce the amount of reporting used to report Walsh sequences compared to the prior art that reports Walsh sequences to each terminal.

The configuration of the base station according to Embodiment 2 of the present invention is similar to the configuration of Embodiment 1 shown in FIG. 7 and is different only in some functions, and therefore only different functions will be described using FIG. 7.

Pilot information determining section 110 stores an operating sequence identification table storing a plurality of candidates for pairs of a cyclic shift amount and a Walsh sequence.

FIG. 12 is a diagram illustrating an example of the operating sequence identification table according to the present embodiment. The operating sequence identification table defines a correspondence relationship (pattern) between two patterns; pattern 1 and pattern 2, as candidates for pairs of a cyclic shift amount of each cyclic shift sequence and a Walsh sequence used for a first stream.

In pattern 1, Walsh sequences "w2, w2, w2, w2, w1, w1, w1, w1" are associated with cyclic shift amounts "0, 2, 3, 4, 6, 8, 9, 10." On the other hand, in pattern 2, Walsh sequences "w1, w1, w1, w1, w2, w2, w2, w2" are associated with cyclic shift amounts "0, 2, 3, 4, 6, 8, 9, 10."

Thus, when attention is focused, for example, on the cyclic shift sequence of cyclic shift amount 0, the operating sequence identification table defines a pair of cyclic shift amount 0 and Walsh sequence w1 and a pair of cyclic shift amount 0 and Walsh sequence w2 according to pattern 1 or pattern 2.

Pilot information determining section 110 determines transmission bands of pilot signals based on the resource assignment information inputted from scheduling section 109, and selects the above-described correspondence relationship (pattern) that can reduce inter-sequence interference of these pilot signals.

Pilot information determining section 110 outputs information indicating the selected correspondence relationship (pattern) to coding section 101 and estimation section 108. When the operating sequence identification table is configured of only one pattern, it is not necessary to report which pattern is selected or report the selected pattern, and it is therefore unnecessary to report information indicating the selected correspondence relationship (pattern).

Furthermore, pilot information determining section 110 determines a combination (pair) of a cyclic shift sequence and a Walsh sequence of the first stream from the selected correspondence relationship (pattern).

Pilot information determining section 110 determines Walsh sequences of pilot signals used in the second and subsequent streams in substantially the same way as in Embodiment 1. That is, pilot information determining section 110 determines correspondence relationships with Walsh sequences in the second and subsequent streams from among correspondence relationships between a stream number and a Walsh sequence (e.g., pattern A and pattern B shown in FIG. 8) based on the Walsh sequences of the first stream determined above. For example, pilot information determining section 110 determines pattern A when the Walsh sequence of the first stream is w1 and determines pattern B when w2.

Furthermore, pilot information determining section 110 determines cyclic shift amounts of cyclic shift sequences in the second and subsequent streams in addition to the correspondence relationship. For example, pilot information determining section 110 determines cyclic shift amounts of cyclic shift sequences in the second and subsequent streams by adding a fixed offset to the cyclic shift amount of the first stream. Alternatively, assuming the cyclic shift amounts of cyclic shift sequences in the second and subsequent streams are reported as control information, pilot information determining section 110 may determine the cyclic shift amounts of cyclic shift sequences in the second and subsequent streams based on this control information. Pilot information determining section 110 then outputs information indicating the determined cyclic shift amounts and information indicating the correspondence relationship between a stream number and a Walsh sequence to estimation section 108 and outputs information indicating the cyclic shift amount to coding section 101.

The base station then reports the cyclic shift amounts used for cyclic shift sequences in the first stream per scheduling.

Furthermore, the base station reports information indicating which correspondence relationship of pattern 1 or pattern 2 is used to the terminal at an interval longer than a scheduling interval. Examples of signaling reported at an interval longer than a scheduling interval include MAC header, RRC signaling or higher layer signaling such as broadcast information.

The configuration of the terminal according to Embodiment 2 of the present invention is similar to the configuration of Embodiment 1 shown in FIG. 9 and is different only in some functions, and therefore only different functions will be described using FIG. 9.

Pilot information determining section 204 stores an operating sequence identification table storing a plurality of correspondence relationships (patterns) between a cyclic shift amount and a Walsh sequence. Pilot information determining section 204 then determines the correspondence relationship between a cyclic shift amount and a Walsh sequence, based on information indicating the correspondence relationship between a cyclic shift amount and a Walsh sequence inputted from decoding section 203 (information reported at an interval longer than that of scheduling).

For example, as the correspondence relationship between a cyclic shift amount and a Walsh sequence, the operating sequence identification table stores pattern 1 and pattern 2 as shown in FIG. 12, and pilot information determining section 204 determines the correspondence relationship based on the information indicating the correspondence relationship between a cyclic shift amount and a Walsh sequence inputted from decoding section 203 (information on pattern 1 or pattern 2).

Furthermore, pilot information determining section 204 determines a Walsh sequence according to information on the cyclic shift amount inputted from decoding section 203 and the above-described correspondence relationship. The information determined here is outputted to pilot signal generation section 205.

Pilot information determining section 204 determines pilot signals used in the second and subsequent streams in substantially the same way as in pilot information determining section 110. For example, pilot information determining section 204 stores a plurality of correspondence relationships between a stream number and a Walsh sequence, and determines the correspondence relationships with Walsh sequences in the second and subsequent streams from among correspondence relationships between a stream number and a Walsh sequence (e.g., pattern A or pattern B shown in FIG. 8), based on the determined Walsh sequence (w1 or w2) of the first stream.

Furthermore, pilot information determining section 204 determines cyclic shift amounts of cyclic shift sequences in the second and subsequent streams according to information on the cyclic shift amount of the first stream inputted from decoding section 203 in the same way as in pilot information determining section 110. The cyclic shift amounts of the cyclic shift sequences determined here are outputted to pilot signal generation section 205.

Next, the correspondence relationship (pattern) between a cyclic shift amount and a Walsh sequence according to the present embodiment will be described in detail. In the present embodiment, pilot information determining section 204 stores an operating sequence identification table storing a plurality of correspondence relationships (patterns) between a cyclic shift amount and a Walsh sequence, and switches between the correspondence relationships (patterns) at an interval longer than the scheduling interval.

The present embodiment reports information indicating a correspondence relationship (pattern) between a cyclic shift amount and a Walsh sequence at an interval longer than the scheduling interval, and can thereby suppress increases in the amount of reporting. Furthermore, by associating a cyclic shift amount with a Walsh sequence, it is possible to change a Walsh sequence by selecting a cyclic shift amount, and thereby maintain the degree of freedom in changing a Walsh sequence per scheduling.

That is, the cyclic shift amount of a cyclic shift sequence is information reported per scheduling, and by associating the cyclic shift amount of a cyclic shift sequence with a Walsh sequence, it is possible to control the cyclic shift amount of a cyclic shift sequence reported per scheduling and set a Walsh sequence, and thereby change a Walsh sequence per scheduling.

Furthermore, by defining a plurality of correspondence relationships (patterns) between a cyclic shift amount and a Walsh sequence and selecting one of the plurality of correspondence relationships (patterns), the possibility that both w1 and w2 may be associated as Walsh sequences associated with their respective cyclic shift amounts increases and the flexibility of Walsh sequences assigned to each terminal can be increased. For example, in two types of patterns in FIG. 12, w1 and w2 are associated with a cyclic shift sequence of a cyclic shift amount of 2, and therefore when the cyclic shift sequence of cyclic shift amount 2 is assigned to the terminal, selection is possible from two types of Walsh sequences w1 and w2.

Furthermore, when eight types of cyclic shift amounts and two types of Walsh sequences are used to a maximum degree for the number of code-multiplexed sequences (four types at most), there are as many as 16 alternatives in selecting a sequence of pilot signals, and therefore even when the number of alternatives (degree of freedom) of pilot signals is reduced, influences of the pilot signals on inter-sequence interference are small. Therefore, even when the number of alternatives decreases (flexibility deteriorates) in the cyclic shift sequence and Walsh sequence, influences on the performance of the entire system are small.

A case has been described above where a plurality of correspondence relationships (patterns) between a cyclic shift amount and a Walsh sequence are provided and the correspondence relationships (patterns) are reported at a long interval, but the correspondence relationships (patterns) may be fixed to one type as shown in FIG. 13. This results in reporting with only three bits of a cyclic shift amount as in the case of the prior art, and can thereby further reduce the amount of reporting on Walsh sequences. Furthermore, as described above, when eight types of cyclic shift amounts and two types of Walsh sequences are used to a maximum degree with respect to the number of code-multiplexed sequences (four types at most), there are as many as 16 alternatives in selecting a sequence of pilot signals, and therefore even when the number of alternatives (degree of freedom) of pilot signals is reduced, influences of the pilot signals on inter-sequence interference are small.

When only an LTE-A terminal is assumed, associating the same number of Walsh sequences w1 and w2 with cyclic shift sequences makes it possible to equalize the probabilities of w1 and w2 being used respectively and substantially equalize the probabilities of inter-sequence interference occurring between pilot signals. Of the pairs of a cyclic shift amount and a Walsh sequence, the patterns shown in FIG. 12 and FIG. 13 respectively are examples where the number of pairs with Walsh sequence w1 and the number of pairs with Walsh sequence w2 are equal. That is, in the respective patterns shown in FIG. 12 and FIG. 13, four Walsh sequences w1 and four Walsh sequences w2 are associated with eight types of cyclic shift amounts. Here, when "0, 2, 3, 4, 6, 8, 9, 10" are defined as cyclic shift amounts as in LTE, a correspondence relationship between cyclic shift amounts "0, 2, 3, 4, 6, 8, 9, 10" and Walsh sequences may be defined. Furthermore, when other "1, 5, 7, 11" are defined as cyclic shift amounts, a correspondence relationship between all cyclic shift amounts "0, 1, 2, 3, 4, 5, 6, 7, 8, 9, 10, 11" and Walsh sequences may be defined.

Furthermore, when cyclic shift amount $\Delta 0$ ($\Delta 0 < 12$) used for the first stream is reported, cyclic shift amount $\Delta 1$ used for the second stream is assumed to be ($\Delta 0+6$)mod12, and the cyclic shift amount is assumed to be a ½ symbol length so that the interval between cyclic shift amounts becomes largest (difference in cyclic shift amounts becomes a maximum) (that is, the interval between cyclic shift amounts is 6), with respect to the pair of the cyclic shift amounts, which are most distant from each other (e.g., cyclic shift amount (0, 6)), the Walsh sequence associated with one cyclic shift amount that forms the pair may be different from the Walsh sequence associated with the other cyclic shift amount.

FIG. 14 is an example of the operating sequence identification table in which of a pair of cyclic shift amounts, which are most distant from each other (e.g., cyclic shift amount (0, 6)), the Walsh sequence associated with the one cyclic shift amount that forms the pair is different from the Walsh sequence associated with the other cyclic shift amount. As shown in FIG. 14, for example, Walsh sequence w1 is associated with cyclic shift amount "0" and w2 is associated with cyclic shift amount "6" which is most distant from the cyclic shift amount "6". Similarly, Walsh sequence w1 is associated with cyclic shift amounts "2, 3, 4" and w2 is associated with cyclic shift amounts "8, 9, 10" which are most distant from cyclic shift amounts "2, 3, 4" respectively. Thus, as shown in FIG. 14, different Walsh sequences w1 and w2 are associated with cyclic shift amounts making up pairs of cyclic shift amounts (0, 6), (2, 8), (3, 9), (4, 10), which are most distant from each other respectively.

As shown in the operating sequence identification table in FIG. 14, advantages in the case where cyclic shift amount $\Delta 1$ of the second stream is set to a cyclic shift amount (that is, $\Delta 1=\Delta 0+6$), which is most distant from cyclic shift amount $\Delta 0$ of the first stream, will be described using FIG. 15.

In FIG. 15, candidates for pairs of a cyclic shift amount of each cyclic shift sequence and a Walsh sequence used for the first stream are defined in an operating sequence identification table. A case will then be considered where cyclic shift amount $\Delta 1$ of the second stream is set to a cyclic shift amount (that is, $\Delta 1=\Delta 0+6$) most distant from cyclic shift amount $\Delta 0$ of the first stream. At this time, when "0" is reported as cyclic shift amount $\Delta 0$ of the first stream, cyclic shift amount $\Delta 1$ of the second stream is set to "6" and Walsh sequences of the first and second streams are set to w1. On the other hand, when "6" is reported as cyclic shift amount $\Delta 0$ of the first stream, cyclic shift amount $\Delta 1$ of the second stream is set to "0" and Walsh sequences of the first and second streams are set to w2.

That is, both the pairs of cyclic shift amounts of the first and second streams are (0,6), but Walsh sequences set in the first and second streams can be switched depending on which of "0" or "6" the base station reports to the terminal as cyclic shift amount Δ0 of the first stream.

Thus, when the cyclic shift amount of the second stream is set to a cyclic shift amount distant by a predetermined amount of offset from the cyclic shift amount of the first stream in the operating sequence identification table, different Walsh sequences are associated with the cyclic shift amounts (CS1 and CS2) distant from each other by the predetermined amount of offset. Thus, it is possible to set different Walsh sequences in the first and second streams depending on whether the cyclic shift amount reported from the base station to the terminal is CS1 or CS2.

On the other hand, when the cyclic shift amount of the second stream is set to a cyclic shift amount most distant from the cyclic shift amount of the first stream, if the same Walsh sequence is associated with the cyclic shift amounts (CS1 and CS2), which are most distant from each other in the cyclic shift amount, the same Walsh sequence is set regardless of whether the cyclic shift amount reported from the base station to the terminal is CS1 or CS2. For this reason, the degree of freedom in changing Walsh sequences is reduced compared to a case where different Walsh sequences are associated with the cyclic shift amounts (CS1 and CS2), which are most distant from each other. Furthermore, in order to switch between Walsh sequences associated with cyclic shift amounts (CS1 and CS2) which are most distant from each other, as described using FIG. 12, it is necessary to report through higher layer signaling which pattern should be used, which requires an extra reporting bit.

MODIFICATION EXAMPLE 1

While LTE-A terminals use Walsh sequence w1 or w2, LTE terminals are not assumed to use Walsh sequences and have no requirements regarding Walsh sequences, which is equivalent to always using Walsh sequence w1. Here, assuming an environment in which LTE terminals and LTE-A terminals coexist, while the probabilities of LTE-A terminals using Walsh sequence w1 and w2 are substantially the same, the probability of LTE terminals using Walsh sequence w1 is higher. Therefore, when Walsh sequence w1 is used, the probability of inter-sequence interference occurring in pilot signals is higher than when Walsh sequence w2 is used.

Thus, among pairs of a cyclic shift sequence and a Walsh sequence in a correspondence relationship (pattern) stored in the operating sequence identification table, the number of pairs of Walsh sequence w1 is made to be smaller than the number of pairs of Walsh sequence w2. Here, Walsh sequence w1 is [1 1] and is a sequence, all elements of which are composed of "1"s.

FIG. 16 is a diagram illustrating candidates for pairs of a cyclic shift sequence and a Walsh sequence. As shown in FIG. 16, for example, Walsh sequences "w1, w1, w1, w2, w2, w2, w2, w2" are associated with cyclic shift amounts "0, 2, 3, 4, 6, 8, 9, 10" respectively, and suppose the number of pairs with Walsh sequence w1 is three and the number of pairs with Walsh sequence w2 is five so that the number of pairs with Walsh sequence w1 is smaller than the number of pairs with Walsh sequence w2.

Thus, providing a difference between the number of pairs with Walsh sequence w1 and the number of pairs with Walsh sequence w2 causes Walsh sequence w2 less prone to inter-sequence interference to be more likely to be selected than Walsh sequence w1 used by LTE terminals, and can thereby reduce inter-sequence interference from LTE terminals.

For example, in an environment in which there are many LTE terminals, making it easier to use Walsh sequences of w2 in pattern 2 can reduce inter-sequence interference in pilot signals, while in an environment in which the number of LTE terminals is at the same level as that of LTE-A terminals, inter-sequence interference in pilot signals can be reduced by using substantially the same number of Walsh sequences w1 and w2 in pattern 1. This correspondence relationship is changed at an interval longer than that of scheduling.

MODIFICATION EXAMPLE 2

In a cyclic shift sequence, the smaller the distance in cyclic shift amounts between cyclic shift sequences, the greater is inter-sequence interference. Inter-sequence interference is large, for example, between a cyclic shift sequence having a cyclic shift amount of 2 and a cyclic shift sequence having a cyclic shift amount of 1 or 3. Therefore, the closer in cyclic shift amounts, the more preferable it is to reduce inter-sequence interference using different Walsh sequences.

Thus, when neighboring cyclic shift amounts are discontinuous, any one of the same Walsh sequence and a different Walsh sequence is associated and when neighboring cyclic shift amounts are continuous, Walsh sequences of different signs are associated.

FIG. 17 is a diagram illustrating candidates for pairs of a cyclic shift sequence and a Walsh sequence. As shown in FIG. 17, Walsh sequences "w2, w1, w2, w1, w2, w2, w1, w2" are associated with cyclic shift amounts "0, 2, 3, 4, 6, 8, 9, 10" respectively and different Walsh sequences among neighboring cyclic shift amounts are associated with continuous cyclic shift amounts "2, 3, 4" and "8, 9, 10."

Thus, by making Walsh sequences that form pairs with neighboring cyclic shift amounts differ from each other, it is possible to reduce inter-sequence interference between cyclic shift sequences of neighboring cyclic shift amounts having maximum inter-sequence interference.

(Modification example 1) and (modification example 2) may be combined. For example, in FIG. 17, the number of pairs with Walsh sequence w1 is three and the number of pairs with Walsh sequence w2 is five so that the number of pairs with Walsh sequence w1 is smaller than the number of pairs with Walsh sequence w2.

MODIFICATION EXAMPLE 3

In a cyclic shift sequence, the smaller the distance in cyclic shift amounts between cyclic shift sequences, the greater is inter-sequence interference. Therefore, the smaller the distance in cyclic shift amounts between cyclic shift sequences, the more preferable it is to use different Walsh sequences.

Therefore, Walsh sequence w2 is paired with cyclic shift sequences of odd-numbered cyclic shift amounts and Walsh sequence w1 is paired with cyclic shift sequences of even-numbered cyclic shift amounts.

FIG. 18 and FIG. 19 are diagrams illustrating candidates for pairs of a cyclic shift sequence and a Walsh sequence. As shown in FIG. 19, also when the number of operating streams is assumed to be four, different Walsh sequences can be set between neighboring cyclic shift amounts, and therefore inter-sequence interference can be reduced. For example, the first terminal may use cyclic shift amounts "0, 6" and the second terminal may use cyclic shift amounts "3, 9" to perform MU (Multi User)-MIMO, and can thereby set different Walsh sequences among neighboring cyclic shift amounts while keeping the maximum interval between cyclic shift amount, and thereby reduce inter-sequence interference.

Furthermore, in LTE-A uplink MIMO transmission, not only cyclic shift amounts reported in LTE but all cyclic shift amounts may be used. For example, when cyclic shift amounts of the second stream are determined with an offset from the first stream, if offset amount 3 and cyclic shift amount 2 of the first stream are reported, the cyclic shift amount of the second stream is determined to be 5, and cyclic shift amount 5 which is not defined in LTE is used. In this case, if the above-described correspondence relationship is used, different Walsh sequences between neighboring cyclic shift amounts are also used, and it is thereby possible to reduce inter-sequence interference between cyclic shift sequences whose cyclic shift amounts are close to each other.

In the second and subsequent streams, Walsh sequences may be set as in the case of Embodiment 1 or without being limited to this, Walsh sequences may also be set in the second and subsequent streams as in the case of the first stream. For example, the base station may report cyclic shift amounts in the second and subsequent streams so that codes of Walsh sequences may be derived from cyclic shift amounts as in the case of the above-described first stream. Even if Embodiment 2 is applied independently of Embodiment 1, it is possible to suppress increases in the amount of reporting Walsh sequences.

Embodiment 3

In Embodiment 2, the correspondence relationship between a cyclic shift amount and a Walsh sequence used for the first stream is defined in the operating sequence identification table. Then, a case has been described where Walsh sequences of the second stream are Walsh sequences having the same sign as that in the first stream, Walsh sequences in the third and subsequent streams are selected from among Walsh sequences having the same sign as or a sign different from that of Walsh sequences used in the first and second streams or Walsh sequences having a sign different from that of the Walsh sequences in the first and second streams. That is, a method of implicitly determining Walsh sequences in the second and subsequent streams from stream numbers has been described.

The present embodiment will describe a method of implicitly determining Walsh sequences in the first stream, and second and subsequent streams according to cyclic shift amounts using one operating sequence identification table indicating a correspondence relationship between a cyclic shift amount and a Walsh sequence. That is, the present embodiment implicitly determines Walsh sequences in the first to fourth streams according to cyclic shift amounts using an operating sequence identification table independent of the number of streams (rank).

In the present embodiment, the base station and terminal share offset information, which is a difference between a cyclic shift amount of the first stream and cyclic shift amounts in the second to fourth streams beforehand, and the base station and terminal determines a cyclic shift amount of each stream based on the offset information.

FIG. 20 is a diagram illustrating an example of offset information indicating a difference between the cyclic shift amount of the first stream and the cyclic shift amounts of the second to fourth streams. Based on the offset information shown in FIG. 20, upon receiving a report from the base station on cyclic shift amount $\Delta 0$ ($\Delta 0 < 12$) used for the first stream (stream #0), the terminal assumes cyclic shift amount $\Delta 1$ used for the second stream (stream #1) to be $(\Delta 0+6)$ mod12, cyclic shift amount $\Delta 2$ used for the third stream (stream #2) to be $(\Delta 0+3)$mod12, and cyclic shift amount $\Delta 3$ used for the fourth stream (stream #3) to be $(\Delta 0+9)$mod12 (pattern 1 in FIG. 20). Alternatively, the terminal assumes cyclic shift amount $\Delta 2$ used for the third stream (stream #2) to be $(\Delta 0+9)$mod12, and cyclic shift amount $\Delta 3$ used for the fourth stream (stream #3) to be $(\Delta 0+3)$mod12 (pattern 2 in FIG. 20).

Since the configuration of the base station according to Embodiment 3 of the present invention is similar to the configuration of Embodiment 1 shown in FIG. 7 and is different only in some functions, only different functions will be described using FIG. 7.

Pilot information determining section 110 determines cyclic shift amounts in cyclic shift sequences used for the second to fourth streams. Here, the cyclic shift amounts in the second and subsequent streams are determined by adding a fixed offset to the cyclic shift amount of the first stream. For example, when the base station and terminal share the offset information shown in pattern 1 in FIG. 20, if the cyclic shift amount used for the first stream (stream #0) from the base station is assumed to be $\Delta 0$ ($\Delta 0 < 12$), pilot information determining section 110 determines cyclic shift amount $\Delta 1$ used for the second stream (stream #1) to be $(\Delta 0+6)$mod12, determines cyclic shift amount $\Delta 2$ used for the third stream (stream #2) to be $(\Delta 0+3)$mod12 and determines cyclic shift amount $\Delta 3$ used for the fourth stream (stream #3) to be $(\Delta 0+9)$mod12.

Furthermore, pilot information determining section 110 stores an operating sequence identification table storing a plurality of candidates for pairs of a cyclic shift amount and a Walsh sequence.

FIG. 21 is a diagram illustrating an example of the operating sequence identification table according to the present embodiment. The operating sequence identification table defines candidates for pairs of a cyclic shift amount of each cyclic shift sequence and a Walsh sequence used for the first stream. To be more specific, Walsh sequences "w1, (w1), w2, w2, w1, (w2), w1, (w1), w2, w2, w1, (w2)" are associated with cyclic shift amounts "0, (1), 2, 3, 4, (5), 6, (7), 8, 9, 10, (11)."

Pilot information determining section 110 then sets Walsh sequences corresponding to the reported cyclic shift amounts of the first stream in Walsh sequences of the first stream based on the operating sequence identification table. Furthermore, Walsh sequences corresponding to cyclic shift amounts $\Delta 1$, $\Delta 2$ and $\Delta 3$ of the secodn, third and fourth streams are determined respectively.

Pilot information determining section 110 then outputs information on the cyclic shift amounts and Walsh sequences of each stream to coding section 101 and estimation section 108. Since cyclic shift amounts in the second and subsequent streams are determined based on the cyclic shift amounts and offset information of the first stream, only cyclic shift amounts of the first stream may be inputted to coding section 101. Furthermore, since Walsh sequences of each stream are determined from cyclic shift amounts of each stream, the Walsh sequences of each stream need not be inputted to coding section 101.

The configuration of the terminal according to Embodiment 3 of the present invention is similar to the configuration of Embodiment 1 shown in FIG. 9 and is different only in some functions, and therefore only different functions will be described using FIG. 9.

Pilot information determining section 204 determines cyclic shift amounts in the second and subsequent streams based on information on cyclic shift amounts of the first stream inputted from decoding section 203 and offset information shared beforehand between the base station and terminal. That is, the cyclic shift amounts in the second and subsequent streams are determined by adding a fixed offset to the cyclic shift amounts of the first stream reported as control information. For example, when the offset information shown in pattern 1 of FIG. 20 is shared between the base station and terminal, if the cyclic shift amount used for the first stream (stream #0) from the base station is Δ0 (Δ0<12), pilot information determining section 204 determines cyclic shift amount Δ1 used for the second stream (stream #1) to be (Δ0+6)mod12, determines cyclic shift amount Δ2 used for the third stream (stream #2) to be (Δ0+3)mod12 and determines cyclic shift amount Δ3 used for the fourth stream (stream #3) to be (Δ0+9)mod12.

Furthermore, pilot information determining section 204 determines Walsh sequences of each stream, based on the operating sequence identification table storing a correspondence relationship between a cyclic shift amount and a Walsh sequence shared between the base station and terminal. That is, pilot information determining section 204 selects Walsh sequences of each stream corresponding to determined cyclic shift amounts Δ0, Δ1, Δ2 and Δ3 of each stream from the operating sequence identification table. Pilot information determining section 204 then outputs the determined cyclic shift amounts and Walsh sequences of each stream to pilot signal generation section 205.

Next, the operating sequence identification table according to the present embodiment shown in FIG. 21 will be described.

First, when an offset amount, which is a difference between the cyclic shift amount of the first stream and the cyclic shift amount of the second stream is assumed to be ΔCS, a pair of cyclic shift amounts, an interval of which is this offset amount ΔCS, will be considered. For example, when offset amount ΔCS is six, there are pairs of (0, 6), (2, 8), (3, 9) and (4, 10). As shown in FIG. 21, in the present embodiment, cyclic shift amounts that form a pair are associated with the same Walsh sequence.

Thus, when a cyclic shift amount distant by offset amount ΔCS from a cyclic shift amount of the first stream is set as a cyclic shift amount of the second stream, cyclic shift amounts, an interval of which is ΔCS, are associated with the same Walsh sequence, and the first stream and second stream can thereby be set in the same Walsh sequence.

Furthermore, in the present embodiment, when groups (three types) are formed of cyclic shift sequences, an interval between cyclic shift amounts of which is 3 (that is, ½ of maximum value "6" of the cyclic shift amount interval), the respective groups are associated with only Walsh sequence w1, only Walsh sequence w2 and both Walsh sequences w1 and w2, respectively. For example, in the operating sequence identification table shown in FIG. 21, the group formed of cyclic shift amounts "1, 4, 7, 10" is associated with only Walsh sequence w1. Furthermore, the group formed of cyclic shift amounts "2, 5, 8, 11" is associated with only Walsh sequence w2. Furthermore, the group formed of cyclic shift amounts "0, 3, 6, 9" is associated with two Walsh sequences w1 and w2 respectively.

FIG. 22 is a diagram illustrating a correspondence relationship between a cyclic shift amount and a Walsh sequence set in the second to fourth streams when the operating sequence identification table shown in FIG. 21 is used. As is clear from FIG. 22, when the base station reports any one of cyclic shift amounts "0, 3, 6, 9" to the terminal, the first to fourth streams are associated with both Walsh sequences w1 and w2. On the other hand, when the base station reports any one of cyclic shift amounts "1, 4, 7, 10" to the terminal, the first to fourth streams are associated with only Walsh sequence w1. Furthermore, when the base station reports any one of cyclic shift amounts "2, 5, 8, 11" to the terminal, the first to fourth streams are associated with only Walsh sequence w2. In LTE, "1, 5, 7, 11" cannot be reported as cyclic shift amounts, but by reporting cyclic shift amounts other than "1, 5, 7, 11," the base station can set Walsh sequences of the first to fourth streams.

Thus, in the present embodiment, pilot information determining section 110 and pilot information determining section 204 store a single operating sequence identification table that defines candidates for pairs of a cyclic shift amount of each cyclic shift sequence and a Walsh sequence used for the first stream, and can thereby switch between Walsh sequences in the second and subsequent streams according to cyclic shift amounts of the first stream.

Furthermore, as is clear from FIG. 22, when transmission is performed with two streams, the same Walsh sequence is set in the first stream and second stream irrespective of cyclic shift amounts. In the case of three or more streams, it is observed that by selecting cyclic shift amounts of the first stream to be reported, it is possible to select whether Walsh sequences used in the third and subsequent streams have the same sign as or a different sign from that of Walsh sequences used in the first and second stream. Pilot information determining section 110 and pilot information determining section 204 need only to store one operating sequence identification table indicating a "correspondence relationship between a cyclic shift amount and a Walsh sequence" as shown in FIG. 21.

As described above, in the present embodiment, when offset amount ΔCS, which is a difference in cyclic shift amounts between the first stream and the second stream, is assumed to be fixed, in the operating sequence identification table, of a pair of cyclic shift amounts, which are distant by offset amount ΔCS from each other, the same Walsh sequence is associated with one cyclic shift amount and the other cyclic shift amount that form the pair. Thus, the same Walsh sequence is set in the first stream and the second stream irrespective of cyclic shift amounts.

When offset amount ΔCS, which is a difference in cyclic shift amounts between the first stream and the second stream, is a maximum value between the cyclic shift amounts, if cyclic shift amount groups, a cyclic shift amount interval of which is ½ of offset amount ΔCS are formed, the respective cyclic shift amount groups are associated with only a first Walsh sequence, only a second Walsh sequence and both the first and second Walsh sequences respectively. Thus, in the operating sequence identification table, in a plurality of cyclic shift amount groups formed of cyclic shift amounts, a cyclic shift amount interval of which is ½ of a maximum value of the cyclic shift amount interval, the Walsh sequence associated with cyclic shift amounts included in the first cyclic shift amount group is a first Walsh sequence, the Walsh sequence associated with cyclic shift amounts included in the second cyclic shift amount group is a second Walsh sequence and the Walsh sequences associated with cyclic shift amounts included in the third cyclic shift amount group are the first and second Walsh sequences. Thus, by selecting a cyclic shift amount of the first stream to be reported, it is possible to select whether the Walsh sequence used in the third and subsequent streams should be a Walsh sequence having the same sign as that of the Walsh sequence used in the first and second streams or a Walsh sequence having a different sign.

Thus, the present embodiment sets Walsh sequences in each stream using one "correspondence relationship between a cyclic shift amount and a Walsh sequence" and the amount of offset in cyclic shift amounts between the first stream and another stream. This eliminates the need for storing an operating sequence identification table for every stream number (rank) and also eliminates the need for processing corresponding to the plurality of operating sequence identification tables, and can thereby reduce the circuit scale. That is, by arranging cyclic shift amounts in the second and subsequent streams between the base station and terminal, cyclic shift amounts in the second and subsequent streams are determined by only reporting cyclic shift amounts of the first stream and Walsh sequences in each stream can be set using one "correspondence relationship between a cyclic shift amount and a Walsh sequence," which is independent of the stream number (rank), with respect to this cyclic shift amount.

A case has been described above where the number of operating streams is four and pilot signals are transmitted using four streams as an example, but even in a case where the number of operating streams is 2 or 3, the Walsh sequence of the second stream is assumed to have the same sign as that of the Walsh sequence of the first stream and Walsh sequences in the third and subsequent streams are assumed to have the same sign or a different sign. Furthermore, when the number of streams of pilot signals is two or less, for example, when the number of transmission antennas is two or less, pilot signals are transmitted with the same Walsh sequence.

Furthermore, the pattern in which a cyclic shift sequence is associated with a Walsh sequence may differ from one cell to another. Even in the same cyclic shift sequence, Walsh sequences may be common or different between cells and inter-sequence interference of pilot signals can be randomized (averaged) between cells.

Furthermore, the above-described pattern numbers may be associated with UE-specific information (UEID or the like), cell ID or the like. This eliminates the need for reporting correspondence relationship patterns, and can reduce the amount of reporting from the base station.

Furthermore, the operating sequence identification table with the above-described patterns may be updated to a new operating sequence identification table by the base station reporting a new operating sequence identification table through higher layer signaling. That is, the table need not be specified by a specification. This allows a correspondence relationship pattern to be changed according to proportions of LTE terminals and LTE-A terminals.

A case has been described above where Walsh sequences are used in addition to cyclic shift sequences, but the present invention is not limited to Walsh sequences; the present invention is likewise applicable to any orthogonal sequence or sequence having a high level of orthogonality. For example, Walsh sequences may be substituted by OCC (Orthogonal Cover Code).

Furthermore, the Walsh sequence length is not limited to 2, but may be other sequence lengths.

Furthermore, assignment control information may also be referred to as "DCI (Downlink Control Information)" or "PDCCH."

Furthermore, in Embodiment 1, the base station reports a correspondence relationship (pattern) between a stream number and a Walsh sequence to each terminal, but the base station may also report a Walsh sequence to be used for the first stream to each terminal.

Although an antenna has been described in the aforementioned embodiments, the present invention may be similarly applied to an antenna port.

The antenna port refers to a logical antenna including a single or a plurality of physical antenna(s). That is, the antenna port is not limited to a single physical antenna, but may refer to an array antenna including a plurality of antennas.

For example, in 3 GPP LTE, how many physical antennas are included in the antenna port is not specified, but the minimum unit allowing the base station to transmit different reference signals is specified.

In addition, the antenna port may be specified as a minimum unit for multiplying a weight of the pre-coding vector.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-229649, filed on Oct. 1, 2009 and Japanese Patent Application No. 2010-086141, filed on Apr. 2, 2010, including the specification, drawings and abstract is incorporated herein by reference in its entirety.

INDUSTRIAL APPLICABILITY

The terminal station apparatus or the like according to the present invention is suitable for use as a terminal station apparatus or the like that reduces inter-sequence interference in pilot signals between terminals while suppressing to a low level inter-sequence interference in a plurality of pilot signals used by the same terminal even when SU-MIMO and MU-MIMO are applied simultaneously.

REFERENCE CODES LIST

100 Base station
101, 207 Coding section
102, 208 Modulation section
103, 212 RF transmission section
104, 201 RF reception section 105 Separation section
106, 111 DFT section
107, 112 Demapping section
108 Estimation section
109 Scheduling section
110, 204 Pilot information determining section
113 Signal separation section
114 IFFT section
115, 202 Demodulation section
116, 203 Decoding section
117 Error detection section
200 Terminal
205 Pilot signal generation section
206 CRC section
209 Allocation section
210 Multiplexing section
211 Transmission power/weight control section

The invention claimed is:
1. A terminal apparatus comprising:
circuitry, which, in operation, generates a reference signal using an orthogonal sequence, which is associated with one of a plurality of layer numbers based on one of a plurality of associations; and
a transmitter, which, in operation, transmits the reference signal multiplexed with a data signal having a bandwidth that is different from a bandwidth of a data signal transmitted by another terminal apparatus,
wherein the layer numbers correspond to a first layer, a second layer, a third layer and a fourth layer, and the plurality of associations include:
(i) a first association, in which the orthogonal sequence of [1, 1] is associated with the first layer, the orthogonal sequence of [1, 1] is associated with the second layer, the orthogonal sequence of [1, −1] is associated with the third layer, and the orthogonal sequence of [1, −1] is associated with the fourth layer;
(ii) a second association, in which the orthogonal sequence of [1, −1] is associated with the first layer, the orthogonal sequence of [1, −1] is associated with the second layer, the orthogonal sequence of [1, 1] is associated with the third layer, and the orthogonal sequence of [1, 1] is associated with the fourth layer;
(iii) a third association, in which the orthogonal sequence of [1, 1] is associated with each of the first layer, the second layer, the third layer and the fourth layer; and
(iv) a fourth association, in which the orthogonal sequence of [1, −1] is associated with each of the first layer, the second layer, the third layer and the fourth layer.
2. The terminal apparatus according to claim 1, wherein the circuitry, in operation, generates the reference signal using a cyclic shift value associated with the one of the plurality of layer numbers.
3. The terminal apparatus according to claim 2, wherein the cyclic shift value is one of 12 cyclic shifts values ranging from 0 to 11, and
a difference between cyclic shift values, with which the first layer and the second layer are respectively associated, is 6; a difference between cyclic shift values, with which the third layer and the fourth layer are respectively associated, is 6; and a difference between cyclic shift values, with which the first layer and the third layer are respectively associated, is 3.

4. A terminal apparatus comprising:
circuitry, which, in operation, generates a reference signal using an orthogonal sequence, which is associated with one of a plurality of layer numbers based on one of a plurality of associations; and
a transmitter, which, in operation, transmits the reference signal multiplexed with a data signal having a bandwidth that is different from a bandwidth of a data signal transmitted by another terminal apparatus,
wherein the layer numbers are consecutive numbers, and the plurality of associations include:
(i) a first association, in which the orthogonal sequence of [1, 1] is associated with the first to a Nw-th layer(s), and the orthogonal sequence of [1, −1] is associated with a (Nw+1)-th and subsequent layer(s); and
(ii) a second association, in which the orthogonal sequence of [1, −1] is associated with the first to a Nw-th layer(s), and the orthogonal sequence of [1, 1] is associated with a (Nw+1)-th and subsequent layer(s),
wherein Nw is a positive integer.
5. The terminal apparatus according to claim 4, wherein the circuitry, in operation, generates the reference signal using a cyclic shift value associated with the one of the plurality of layer numbers.
6. The terminal apparatus according to claim 5, wherein the cyclic shift value is one of 12 cyclic shifts values ranging from 0 to 11, and
a difference between cyclic shift values, with which the first layer and a second layer are respectively associated, is 6; a difference between cyclic shift values, with which a third layer and a fourth layer are respectively associated, is 6; and a difference between cyclic shift values, with which the first layer and the third layer are respectively associated, is 3.
7. The terminal apparatus according to claim 4, wherein the Nw is variable.
8. The terminal apparatus according to claim 4, wherein a number of layers is 4, and the Nw is 2 or 4.
9. The terminal apparatus according to claim 4, wherein the layer numbers correspond to the first layer, a second layer, a third layer and a fourth layer, and when the Nw is 2:
in the first association, the orthogonal sequence of [1, 1] is associated with the first layer, the orthogonal sequence of [1, 1] is associated with the second layer, the orthogonal sequence of [1, −1] is associated with the third layer, and the orthogonal sequence of [1, −1] is associated with the fourth layer; and
in the second association, the orthogonal sequence of [1, −1] is associated with the first layer, the orthogonal sequence of [1, −1] is associated with the second layer, the orthogonal sequence of [1, 1] is associated with the third layer, and the orthogonal sequence of [1, 1] is associated with the fourth layer.
10. The terminal apparatus according to claim 4, wherein the layer numbers correspond to the first layer, a second layer, a third layer and a fourth layer, and when the Nw is 4:
in the first association, the orthogonal sequence of [1, 1] is associated with each of the first layer, the second layer, the third layer and the fourth layer; and
in the second association, the orthogonal sequence of [1, −1] is associated with each of the first layer, the second layer, the third layer and the fourth layer.

11. A transmitting method comprising:
generating a reference signal using an orthogonal sequence, which is associated with one of a plurality of layer numbers based on one of a plurality of associations; and
transmitting, from a terminal, the reference signal multiplexed with a data signal having a bandwidth that is different from a bandwidth of a data signal transmitted by another terminal,
wherein the layer numbers correspond to a first layer, a second layer, a third layer and a fourth layer, and the plurality of associations include:
 (i) a first association, in which the orthogonal sequence of [1, 1] is associated with the first layer, the orthogonal sequence of [1, 1] is associated with the second layer, the orthogonal sequence of [1, −1] is associated with the third layer, and the orthogonal sequence of [1, −1] is associated with the fourth layer;
 (ii) a second association, in which the orthogonal sequence of [1, −1] is associated with the first layer, the orthogonal sequence of [1, −1] is associated with the second layer, the orthogonal sequence of [1, 1] is associated with the third layer, and the orthogonal sequence of [1, 1] is associated with the fourth layer;
 (iii) a third association, in which the orthogonal sequence of [1, 1] is associated with each of the first layer, the second layer, the third layer and the fourth layer; and
 (iv) a fourth association, in which the orthogonal sequence of [1, −1] is associated with each of the first layer, the second layer, the third layer and the fourth layer.

12. The transmitting method according to claim 11, wherein the reference signal is generated using a cyclic shift value associated with the one of the plurality of layer numbers.

13. The transmitting method according to claim 12, wherein the cyclic shift value is one of 12 cyclic shifts values ranging from 0 to 11, and
a difference between cyclic shift values, with which the first layer and the second layer are respectively associated, is 6, a difference between cyclic shift values, with which the third layer and the fourth layer are respectively associated, is 6, and a difference between cyclic shift values, with which the first layer and the third layer are respectively associated, is 3.

14. A transmitting method comprising:
generating a reference signal using an orthogonal sequence, which is associated with one of a plurality of layer numbers based on one of a plurality of associations; and
transmitting, from a terminal, the reference signal multiplexed with a data signal having a bandwidth that is different from a bandwidth of a data signal transmitted by another terminal,
wherein the layer numbers are consecutive numbers, and the plurality of associations include:
 (i) a first association, in which the orthogonal sequence of [1, 1] is associated with the first to a Nw-th layer(s), and the orthogonal sequence of [1, −1] is associated with a (Nw+1)-th and subsequent layer(s); and
 (ii) a second association, in which the orthogonal sequence of [1, −1] is associated with the first to a Nw-th layer(s), and the orthogonal sequence of [1, 1] is associated with a (Nw+1)-th and subsequent layer(s),
wherein Nw is a positive integer.

15. The transmitting method according to claim 14, wherein the reference signal is generated using a cyclic shift value associated with the one of the plurality of layer numbers.

16. The transmitting method according to claim 15, wherein the cyclic shift value is one of 12 cyclic shifts values ranging from 0 to 11, and
a difference between cyclic shift values, with which the first layer and a second layer are respectively associated, is 6, a difference between cyclic shift values, with which a third layer and a fourth layer are respectively associated, is 6, and a difference between cyclic shift values, with which the first layer and the third layer are respectively associated, is 3.

17. The transmitting method according to claim 14, wherein the Nw is variable.

18. The transmitting method according to claim 14, wherein a number of layers is 4, and the Nw is 2 or 4.

19. The transmitting method according to claim 14, wherein the layer numbers correspond to the first layer, a second layer, a third layer and a fourth layer, and when the Nw is 2:
in the first association, the orthogonal sequence of [1, 1] is associated with the first layer, the orthogonal sequence of [1, 1] is associated with the second layer, the orthogonal sequence of [1, −1] is associated with the third layer, and the orthogonal sequence of [1, −1] is associated with the fourth layer; and
in the second association, the orthogonal sequence of [1, −1] is associated with the first layer, the orthogonal sequence of [1, −1] is associated with the second layer, the orthogonal sequence of [1, 1] is associated with the third layer, and the orthogonal sequence of [1, 1] is associated with the fourth layer.

20. The transmitting method according to claim 14, wherein the layer numbers correspond to the first layer, a second layer, a third layer and a fourth layer, and when the Nw is 4:
in the first association, the orthogonal sequence of [1, 1] is associated with each of the first layer, the second layer, the third layer and the fourth layer; and
in the second association, the orthogonal sequence of [1, −1] is associated with each of the first layer, the second layer, the third layer and the fourth layer.

* * * * *